US012744920B2

(12) United States Patent
Adzic

(10) Patent No.: US 12,744,920 B2
(45) Date of Patent: Sep. 22, 2026

(54) ENCODING DEVICE AND METHOD FOR UTILITY-DRIVEN VIDEO COMPRESSION

(71) Applicant: Videopura, LLC, Delray Beach, FL (US)

(72) Inventor: Velibor Adzic, Canton, GA (US)

(73) Assignee: Videopura, LLC

(*) Notice: Subject to any disclaimer, the term of this patent is extended or adjusted under 35 U.S.C. 154(b) by 0 days.

(21) Appl. No.: 17/902,935

(22) Filed: Sep. 5, 2022

(65) Prior Publication Data

US 2022/0417540 A1 Dec. 29, 2022

Related U.S. Application Data

(63) Continuation of application No. PCT/US2021/020837, filed on Mar. 4, 2021.

(60) Provisional application No. 62/985,289, filed on Mar. 4, 2020.

(51) Int. Cl.

| | |
|---|---|
| ***H04N 19/20*** | (2014.01) |
| ***G06V 10/82*** | (2022.01) |
| ***G06V 20/40*** | (2022.01) |

(52) U.S. Cl.

CPC ............ *H04N 19/20* (2014.11); *G06V 20/46* (2022.01); *G06V 10/82* (2022.01)

(58) Field of Classification Search

CPC ......... H04N 19/20; G06V 20/46; G06V 10/82

USPC ........................................................ 375/240.08

See application file for complete search history.

(56) References Cited

U.S. PATENT DOCUMENTS

2004/0125877 A1* 7/2004 Chang .................. G06F 16/739 348/E5.065
2010/0284460 A1* 11/2010 Tsai ...................... H04N 19/17 375/240.12
2012/0106622 A1* 5/2012 Huang .................. H04N 19/14 375/E7.026
2014/0085501 A1* 3/2014 Tran ........................ G06F 3/005 348/222.1
2018/0150695 A1* 5/2018 Guttmann ............. G06V 20/40
2020/0280739 A1* 9/2020 Fitzgerald .............. G06F 3/015
2022/0007019 A1* 1/2022 He ........................ H04N 19/70

* cited by examiner

*Primary Examiner* — Tracy Y. Li

(74) *Attorney, Agent, or Firm* — ACKnowledge IP P.C.; Paul D. Ackerman

(57) ABSTRACT

An encoding device for utility-driven video compression, includes circuitry configured to accept an input video having a first data volume, identify at least a feature of interest in the input video, generate an output video, wherein the output video contains a second data volume that is less than the first data volume and the output video preserves the at least a feature of interest, and encode a bitstream using the output video.

24 Claims, 18 Drawing Sheets

Video Source
Compression and Extraction
Video Bitstream with Metadata
Application
Application
Application Compressed Video Bistream
Video Decoder
Encode Bistream
Encode Bistream
Encode Bistream
Application
Application
Application
Application Video Source
Compression and Extraction
Video Bitstream with Metadata
Sub-bitstream Extractor 904
Encode Bistream
Encode Bistream
Encode Bistream
Application
Application
Application Video Sub-Bitstream
Feature Extraction
Feature Set
Feature Set Video Sub-Bitstream
Video Sub-Bitstream
Feature Extraction
Feature Extraction
Feature Set
Feature Set 1200
Residual
Quant. Transf. Coeff.
Transform/ Quantization 1216
Entropy Coding 1232
1236
Intra Prediction 1208
Inverse Quant/Inv. Transform 1220
Input Video 1204
Predictor
Motion Estimation/ Compensation 1212
Decoded Picture Buffer 1228
In Loop Filter 1224

1300
Entropy Decoder Processor 1304
Inverse Quant/ Inverse Transform 1308
Deblocking Filter 1312
1328
Motion Compensation 1320
Intra Prediction 1324

Frame Buffer 1316

ENCODING DEVICE AND METHOD FOR UTILITY-DRIVEN VIDEO COMPRESSION

CROSS-REFERENCE TO RELATED APPLICATIONS

This application is a continuation application of PCT/US21/20837, filed on Mar. 4, 2021, and entitled "An Encoding Device and Method for Utility Driven Video Compression," which claims the benefit of priority of U.S. Provisional Application Ser. No. 62/985,289, filed on Mar. 4, 2020, and entitled "System and Bitstream for Utility Driven Video Compression and Adaptation," each application is incorporated by reference herein in its entirety.

FIELD OF THE INVENTION

The present invention generally relates to the field of video compression. In particular, the present invention is directed to an encoding device and method for utility-driven video compression.

BACKGROUND

Video-enabled internet-of-Things (IoT) devices are powerful devices that, together with video analytics, can serve as multi-function sensors. A video sensor can be used to detect, count, identify, and classify humans and/or objects and even their actions. Low-cost video sensors primarily capture video and rely on cloud-based services to perform analytics tasks. The large amount of video generated by such devices will consume significant network and storage resources.

SUMMARY OF THE DISCLOSURE

In an aspect, an encoding device for utility-driven video compression, includes circuitry configured to accept an input video having a first data volume, identify at least a feature of interest in the input video, generate an output video, wherein the output video contains a second data volume that is less than the first data volume and the output video preserves the at least a feature of interest, and encode a bitstream using the output video. In another aspect, a method for utility-driven video compression includes accepting, by an encoding device, an input video having a first data volume, identifying, by the encoding device, at least a feature of interest in the input video, generating, by the encoding device, an output video, wherein the output video contains a second data volume that is less than the first data volume and the output video preserves the at least a feature of interest, and encoding, by the encoding device, a bitstream using the output video.

In another aspect, an encoding device for utility-driven video compression includes circuitry configured to accept an input video having a first data volume, identify at least a first feature of interest and at least a second feature of interest in the input video, generate a first output video and a second output video, wherein the first output video contains a second data volume that is less than the first data volume, the first output video preserves the at least a first feature of interest, the second output video contains a third data volume that is less than the first data volume, and the second output video preserves the at least a second feature of interest, encode a first bitstream using the first output video, and encode a second bitstream using the second output video.

In another aspect, a method of utility-driven video compression includes accepting, by an encoding device, an input video having a first data volume, identifying, by the encoding device, at least a first feature of interest and at least a second feature of interest in the input video, generating, by the encoding device, a first output video and a second output video, wherein the first output video contains a second data volume that is less than the first data volume, the first output video preserves the at least a first feature of interest, the second output video contains a third data volume that is less than the first data volume, and the second output video preserves the at least a second feature of interest, encoding, by the encoding device, a first bitstream using the first output video, and encoding, by the encoding device, a second bitstream using the second output video.

In another aspect, an encoding device for utility-driven video compression includes circuitry configured to accept an input video having a first data volume, identify at least a first feature of interest and at least a second feature of interest in the input video, generate an output video, wherein the output video contains a second data volume that is less than the first data volume and the output video preserves the at least a first feature of interest, encode a bitstream using the output video, and encode a metadata stream as a function of the second feature of interest.

In another aspect, a method of utility-driven video compression includes accepting, by an encoding device, an input video having a first data volume, identifying, by the encoding device, at least a first feature of interest and at least a second feature of interest in the input video, generating, by the encoding device, an output video, wherein the output video contains a second data volume that is less than the first data volume and the output video preserves the at least a first feature of interest, encoding, by the encoding device, a bitstream using the output video; and encoding, by the encoding device, a metadata stream as a function of the second feature of interest.

In another aspect, an encoding device for utility-driven video compression includes circuitry configured to accept an input video having a first data volume, identify at least a first feature of interest and at least a second feature of interest in the input video, encode a first metadata stream as a function of the first feature of interest, and encode a second metadata stream as a function of the second feature of interest.

In another aspect, a method of utility-driven video compression includes accepting, by an encoding device, an input video having a first data volume, identifying, by the encoding device, at least a first feature of interest and at least a second feature of interest in the input video, encoding, by the encoding device, a first metadata stream as a function of the first feature of interest, and encoding, by the encoding device, a second metadata stream as a function of the second feature of interest.

In another aspect, an encoding device for utility-driven video compression includes circuitry configured to accept an input video having a first data volume, identify at least a region of interest in the input video, generate an output video, wherein the output video contains a second data volume that is less than the first data volume and the output video preserves the at least a region of interest, and encode a bitstream using the input video and the output video.

In another aspect, a method of utility-driven video compression includes accepting, by an encoding device, an input video having a first data volume, identifying, by the encoding device, at least a region of interest in the input video, generating, by the encoding device, an output video, wherein the output video contains a second data volume that is less than the first data volume and the output video preserves the at least a region of interest, and encoding, by the encoding device, a bitstream using the input video and the output video.

In another aspect, an encoding device for utility-driven video compression includes circuitry configured to accept an input video having a first data volume, identify at least a region of exclusion in the input video, generate an output video, wherein the output video contains a second data volume that is less than the first data volume and the output video excludes the at least a region of exclusion and encode a bitstream using the input video and the output video.

In another aspect, a method of utility-driven video compression includes accepting, by an encoding device, an input video having a first data volume, identifying, by an encoding device, at least a region of exclusion in the input video, generating, by an encoding device, an output video, wherein the output video contains a second data volume that is less than the first data volume and the output video excludes the at least a region of exclusion, and encoding, by an encoding device, a bitstream using the input video and the output video.

In another aspect, an encoding device for utility-driven video compression includes circuitry configured to accept an input video having a first data volume, identify a first temporal section including a first feature of interest and a second temporal section including a second feature of interest in the input video, generate a first output video and a second output video, wherein the first output video contains a second data volume that is less than the first data volume, the first output video contains the first temporal section, the second output video contains a third data volume that is less than the first data volume, and the second output video contains the second temporal section, encode a first bitstream using the input video and the first output video, and encode a second bitstream using the input video and the second output video.

In another aspect, a method of utility-driven video compression includes accepting, by an encoding device, an input video having a first data volume, identifying, by the encoding device, a first temporal section including a first feature of interest and a second temporal section including a second feature of interest in the input video, generating, by the encoding device, a first output video and a second output video, wherein the first output video contains a second data volume that is less than the first data volume, the first output video contains the first temporal section, the second output video contains a third data volume that is less than the first data volume, and the second output video contains the second temporal section, encoding, by the encoding device, a first bitstream using the input video and the first output video, and encoding, by the encoding device, a second bitstream using the input video and the second output video. The details of one or more variations of the subject matter described herein are set forth in the accompanying drawings and the description below. Other features and advantages of the subject matter described herein will be apparent from the description and drawings, and from the claims.

DESCRIPTION OF DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
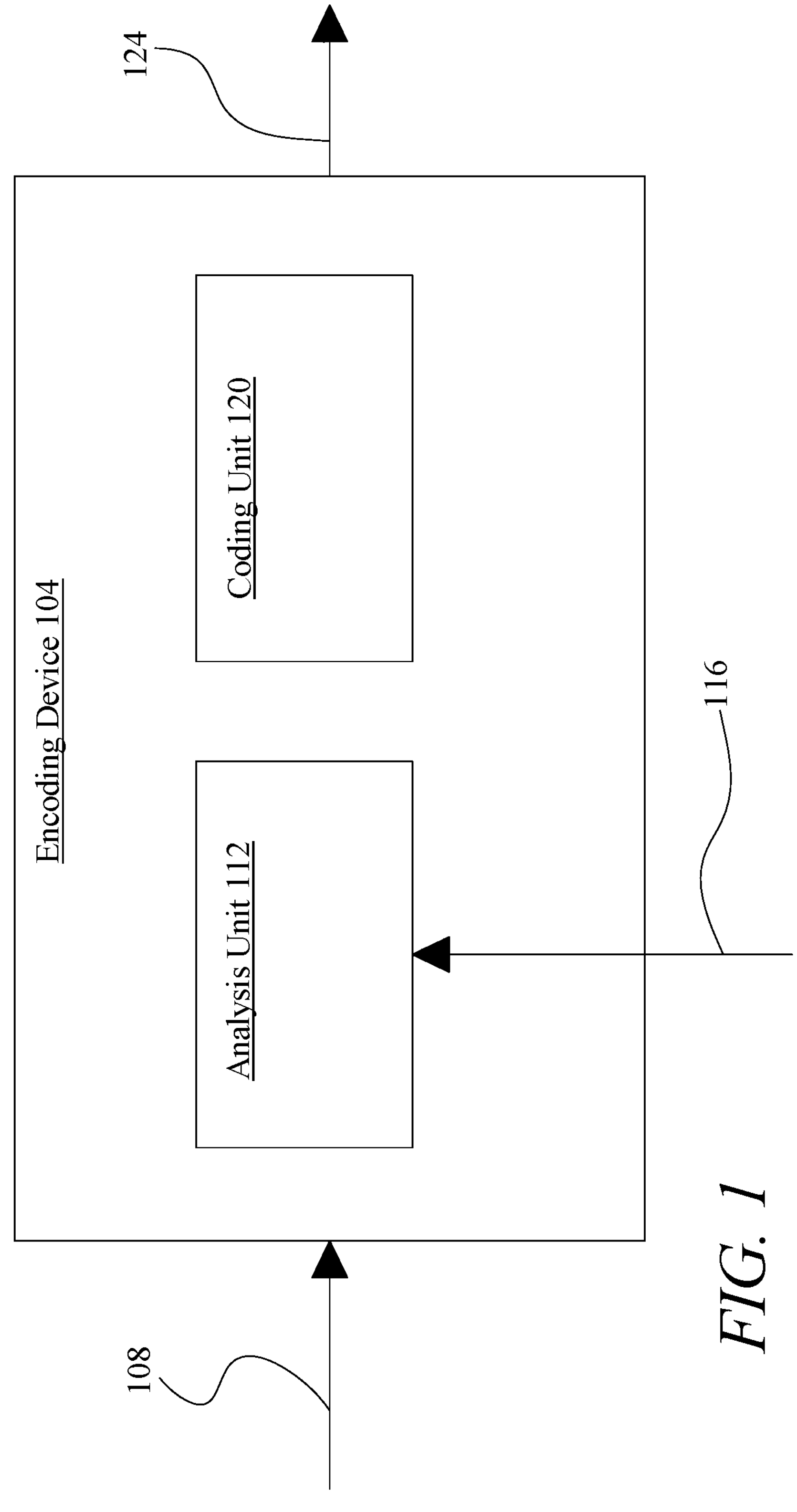
FIG. 1 is a block diagram illustrating an exemplary embodiment of an encoding device.

The drawings are not necessarily to scale and may be illustrated by phantom lines, diagrammatic representations, and fragmentary views. In certain instances, details that are not necessary for an understanding of the embodiments or that render other details difficult to perceive may have been omitted. Like reference symbols in the various drawings indicate like elements.

DETAILED DESCRIPTION

Embodiments described in this disclosure include a video encoding system that significantly reduces transmission and storage costs without affecting the performance of algorithms that process video. A process of reducing the video size will have minimal impact on usefulness or utility of the video—each machine or algorithm processing the video will receive an appropriately compressed and adapted video bitstream that will include all the essential features required by that specific machine/algorithm.

Further disclosed herein are methods for encoding of videos that are intended for processing by video analytic algorithms. Such videos need not be visually pleasing; many details of such videos not needed by analytics algorithms may be removed to reduce video size. In embodiments described herein, video utility may be maintained and/or enhanced if encoded video preserves features used by video analytics algorithms. In embodiments, a bitstream structure that enables efficient compression, and adaptation tools that retain the essential features while disregarding other features, may also be included. For example, if a vehicle counting algorithm is based on motion features, video bitstream delivered to that machine/algorithm may be encoded to preserve motion features that enable reliable vehicle counts while minimizing or eliminating other features. Video encoding for such vehicle counting application may lower video bitrate by not preserving texture and other visual details that are typically intended for human observers and not used by a counting algorithm. Another adaptation or representation of a video bitstream may be employed when streamed for human consumption. In embodiments, a bitstream may be produced that is composed of plurality of video and metadata sub-streams, any or all of which can be decoded and used by a human user or an automated machine terminal.

Embodiments described in this disclosure may produce a massive reduction in encoded video size with minimal impact on intended usefulness or utility of the video in question. A smaller video bitstream size will have a direct and proportional impact in reducing storage and transmission costs. Another benefit may include improved security and privacy by limiting video features received by each application. For example, a video monitoring service intended for detecting falls in elder care centers may be able to use only features needed to detect a person falling, from which full video may be impossible or infeasible to reconstruct with only motion features, and thereby privacy of individuals monitored by the service may be preserved.

Referring now to FIG. 1, an exemplary embodiment of an encoding device 104 is illustrated. Encoding device 104 may be implemented using any digital electronic circuitry as described in this disclosure. Encoding device 104 may include any computing device as described in this disclosure, including without limitation a microcontroller, microprocessor, digital signal processor (DSP) and/or system on a chip (SoC) as described in this disclosure. Encoding device 104, and/or any module and/or component thereof as described in further detail in this disclosure, may be configured by any form of hardware, software, or firmware configuration and/or manufacture, or any combination thereof. Encoding device 104 may include, be included in, and/or communicate with a mobile device such as a mobile telephone or smartphone. Encoding device 104 may include a single computing device operating independently, or may include two or more computing device operating in concert, in parallel, sequentially or the like; two or more computing devices may be included together in a single computing device or in two or more computing devices. Encoding device 104 may interface or communicate with one or more additional devices as described below in further detail via a network interface device. Network interface device may be utilized for connecting encoding device 104 to one or more of a variety of networks, and one or more devices.

Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a 30 telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. For example, encoding device 104 may include, without limitation, a computing device or cluster of computing devices in a first location and a second computing device or cluster of computing devices in a second location. Encoding device 104 may include one or more computing devices dedicated to data storage, security, distribution of traffic for load balancing, and the like. Encoding device 104 may distribute one or more computing tasks as described below across a plurality of computing devices of computing device, which may operate in parallel, in series, redundantly, or in any other manner used for distribution of tasks or memory between computing devices. Encoding device 104 may be implemented using a "shared nothing" architecture in which data is cached at the worker, in an embodiment, this may enable scalability of system 100 and/or computing device.

With continued reference to FIG. 1, encoding device 104 may be designed and/or configured to perform any method, method step, or sequence of method steps in any embodiment described in this disclosure, in any order and with any degree of repetition. For instance, encoding device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoding device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As a non-limiting example, and with further reference to FIG. 1, encoding device 104 and/or one or more module and/or components thereof may be configured to accept input video 108. This may be performed, without limitation, by an analysis unit 112, which may be implemented in any manner suitable for implementation of any computing device, module, and/or component of encoding device 104 as described above. Input video 108 may have any original source, including without limitation computer-generated video, animated video, and/or video captured by a recording device such as without limitation a video camera.

Still referring to FIG. 1, in addition to video input, encoding device 104 and/or analysis unit 112 may accept optional supplemental data 116, which may include without limitation supervised annotation. Supervised notation may include, without limitation, object and/or event detection and/or identification, region-of-interest definition, or any other notation as described in further detail below. Supplemental data 116 may include a trained neural network configuration, such as a set of weights and hyperparameters, which provided as an array structure, and which may be used in conjunction with and/or as a neural network as described in further detail below.

Multiple neural network configurations may be supplied with each neural network configuration used for a specific purpose, as described in further detail below. A neural network configuration may fully specify a neural network. A neural network configuration may include all information necessary to process input data with that neural network.

Continuing to refer to FIG. 1, encoding device 104 and/or analysis unit 112 may analyze input video 108 and/or optional supplemental information and produce an output. Output may include features extracted from input video 108 and data, such as an array of object annotations and/or array of neural network weights and hyperparameters, generated from the supplemental information, or neural network configurations.

Still referring to FIG. 1, encoding device 104 may include a coding unit 120, which may be implemented in any manner suitable for implementation of any computing device, module, and/or component of encoding device 104 as described above. Encoding device 104 and/or coding unit 120 may use output as described above to optimize video coding, such as block-level and/or frame-level quantization, motion estimation, transformation of size and/or parameters of a group of pictures (GOP)-level coding such as a frame structure and/or key-frame placement, for instance and without limitation as described in further detail below. Encoding device 104 and/or coding unit 120 may compress video and/or metadata into an output bitstream 124. Output bitstream 124 may be composed of one or more video and/or metadata sub-streams that may be parsed and/or decoded separately; this may facilitate flexible data transmission which may allow end users and/or devices receiving bitstream to request, receive, and/or decode only a sub-stream that is relevant to a use case of such end users and/or devices. Sub-streams may include, without limitation, a sub-stream for visual consumption by a human user and/or a metadata sub-stream for an automatic consumption by a machine terminal.

Figure 2:
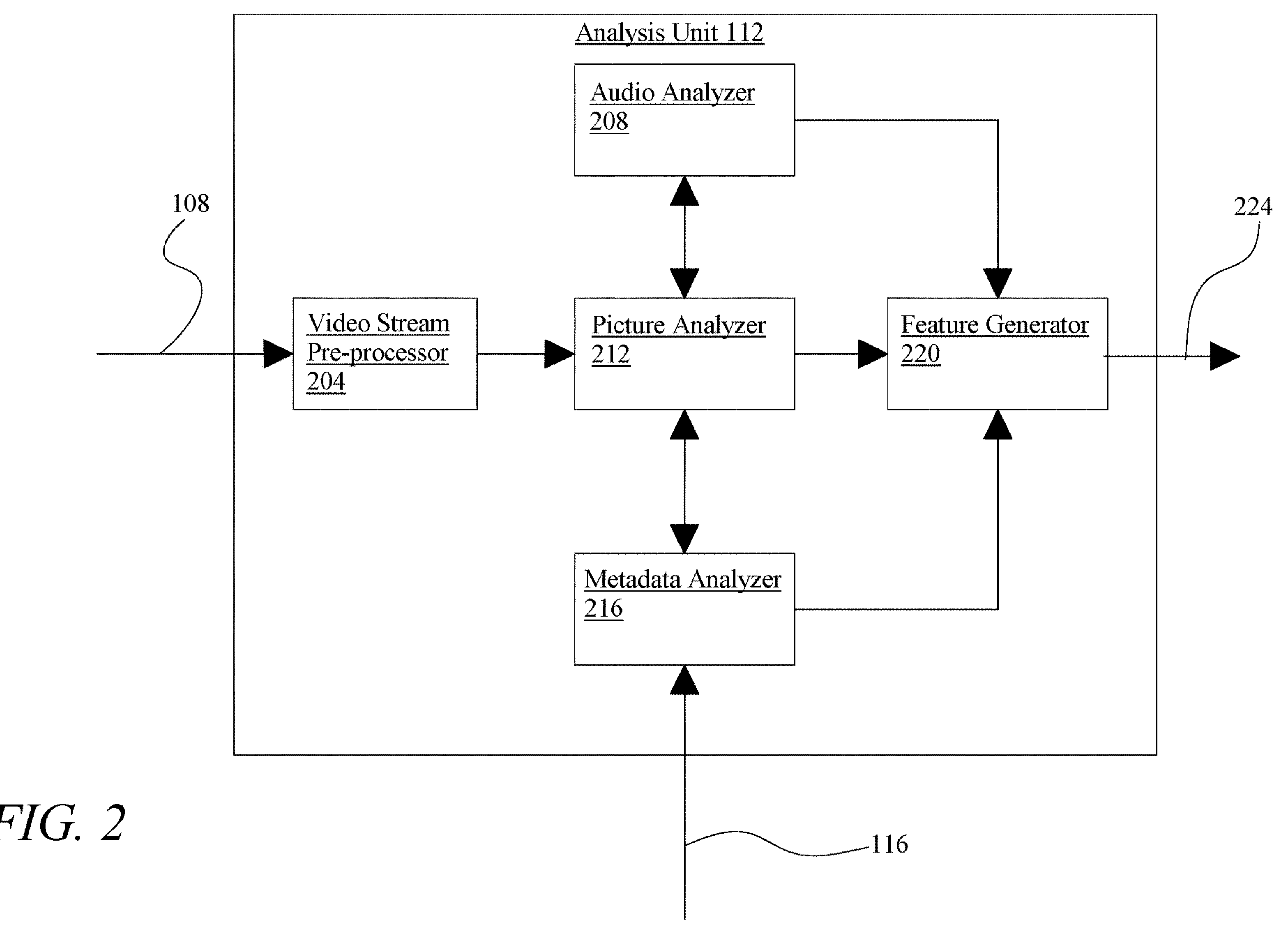
FIG. 2 is a block diagram illustrating an exemplary embodiment of an analysis unit.

Referring now to FIG. 2, an exemplary embodiment of analysis unit 112 is illustrated. Modules and/or components illustrated and described as included in analysis unit 112 are presented for exemplary purposes only; functions and/or structure pertaining to each such module and/or component may be implemented in any alternative or additional manner in encoding device 104 and/or any component, module, and/or device incorporated in or communicatively connected to encoding device 104, in any manner that may occur to persons skilled in the art, upon reviewing the entirety of this disclosure.

Still referring to FIG. 2, analysis unit 112 may include a video stream pre-processor 204, which may be implemented in any manner suitable for implementation of any computing device, module, and/or component of encoding device 104 as described above. Video stream pre-processor 204 may receive input video 108 stream and parse out video, audio and metadata sub-streams of the stream. Video stream pre-processor 204 may include and/or communicate with decoder as described in further detail below; in other words, video stream pre-processor 204 may have an ability to decode input streams. This may allow, in a non-limiting example, decoding of input video 108, which may facilitate downstream pixel-domain analysis.

Further referring to FIG. 2, analysis unit 112 may include an audio analyzer 208, which may be implemented in any manner suitable for implementation of any computing device, module, and/or component of encoding device 104 as described above. Audio analyzer 208 may receive an audio sub-stream, including without limitation from video stream pre-processor 204, and conduct analysis of sounds and/or speech, such as identification speech of at least a person of interest, identification of at least a sound of interest, identification of at least a background sound, or the like. Audio analyzer 208 may be configured to produce a transcript, for instance and without limitation using speech-to-text software and/or modules. Continuing to refer to FIG. 2, analysis unit 112 may include a picture analyzer 212, which may be implemented in any manner suitable for implementation of any computing device, module, and/or component of encoding device 104 as described above. Picture analyzer 212 may receive a video sub-stream from the video stream pre-processor 204 and conduct analysis of visual information in a spatio-temporal domain, such as texture information, color information, face detection, object detection, tracking, or the like.

Still referring to FIG. 2, analysis unit 112 may include a metadata analyzer 216, which may be implemented in any manner suitable for implementation of any computing device, module, and/or component of encoding device 104 as described above. In an embodiment, metadata analyzer 216 may receive a metadata sub-stream from video stream pre-processor 204. Metadata analyzer 216 may receive supplemental information as described above, for instance from an outside source. Metadata analyzer 216 may analyze metadata and/or supplemental information. Metadata analyzer 216 may synchronize metadata and/or supplemental information with time units for an encoder as described in further detail below. Metadata analyzer 216 may parse text in metadata and/or supplemental information, such as without limitation content description, subtitles or other closed-captioned data. Any of audio analyzer 208, picture analyzer 212, and/or metadata analyzer 216 may exchange data with any other of audio analyzer 208, picture analyzer 212, and/or metadata analyzer 216. For example, and without limitation, object information from picture analyzer and/or speech/identity from audio may be used by metadata analyzer to generate metadata that describes the activity in that portion of video or image; as a non-limiting example, object information and/or features may be included as one or more inputs to a neural network, as described below, that generates metadata. Similarly, metadata information that describes contents and/or context may be used to improve object detection and/or determine the types of features to extract from video and audio; as a non-limiting example, metadata may be included as one or more inputs to a neural network, as described below, that generates audio and/or video object information. Output of video analyzer may be used to aid in detection of features and/or objects in audio analyzer; as a non-limiting example, video analyzer outputs may be included as one or more inputs to a neural network, as described below, that generates audio object information and/or features. Output of audio analyzer may be used to aid in detection of features and/or objects in video analyzer; as a non-limiting example, audio analyzer outputs may be included as one or more inputs to a neural network, as described below, that generates video object information and/or features. As a non-limiting example, audio analyzer 208 may detect voice and sends timestamps to picture analyzer 212, which may switch on face recognition at specified timestamps; this way, analysis unit 112 may save processing time since voice analysis may be much faster than face analysis.

With further reference to FIG. 2, analysis unit 112 may include a feature generator 220, which may be implemented in any manner suitable for implementation of any computing device, module, and/or component of encoding device 104 as described above. Feature generator 220 may receive output of audio analyzer 208, picture analyzer 212, and/or metadata analyzer 216.

Feature generator 220 may process outputs of audio analyzer 208, picture analyzer 212, and/or metadata analyzer 216. In an embodiment, feature generator 220 may generate one unified feature stream containing a set of features. A "feature," as used in this disclosure, is a specific structural and/or content attribute of data. Examples of features are provided throughout this disclosure; features may further include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. A unified stream 224 may be output by feature generator 220.

Still referring to FIG. 2, any of audio analyzer 208, picture analyzer 212, metadata analyzer 216, and/or feature generator 220 may use a machine-learning model, machine-learning process, and/or neural network, as described in further detail below, to perform above-described tasks and/or analysis. Machine-learning model parameters, machine-learning process parameters, neural network parameters, and/or neural network configuration may be received, as described above, as supplemental data 116; alternatively, encoding device 104 may train a machine-learning model, machine-learning process, and/or neural network using training data and/or algorithms, for instance and without limitation as described below.

With continued reference to FIG. 2, neural networks may be executed on hardware acceleration designed for neural networks. Encoding device 104 may have one or more hardware acceleration units to speed up execution of a neural network. In an embodiment, where a device has one hardware acceleration unit and selects one or more neural networks and/or neural network configurations to be executed on a single frame, video, element or collection of audio data, and/or element or collection of metadata, encoding device 104 may load and execute one neural network at a time. As a further non-limiting example, where encoding device 104 includes and/or has access to multiple hardware acceleration units, encoding device 104 may execute two or more neural networks concurrently through parallel processing. Encoding device 104 may assign a neural network to a hardware acceleration unit that may execute that neural network, where assignment may depend, without limitation, on a size of the neural network and/or a capacity of the hardware acceleration unit.

Figure 3:
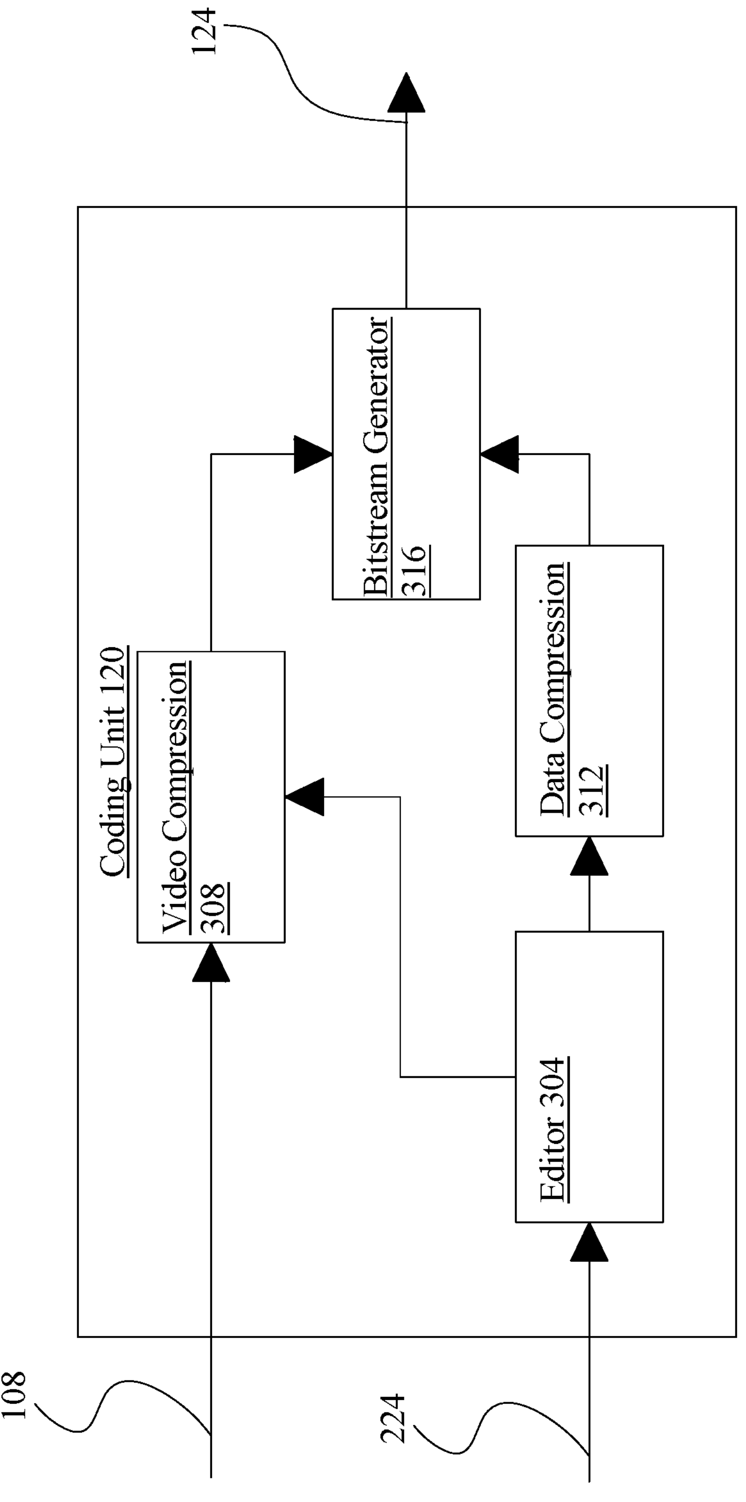
FIG. 3 is a block diagram illustrating an exemplary embodiment of a coding unit.

Referring now to FIG. 3, an exemplary embodiment of a coding unit 120 is illustrated. Coding unit 120 may include, without limitation, an editor component 304, which may be implemented in any manner suitable for implementation of any computing device, module, and/or component of encoding device 104 as described above. Editor component 304 may be configured to receive an output 224 of analysis unit 112. Video and/or data compressors 308, 312 may alternatively or additionally accept manual inputs and/or overrides, which may be received, without limitation through editor component 304. A supplemental input may provide one or more inputs from a user, which may include any inputs as described above, to editor component 304. Editor component 304 may processes output of analysis unit 112. In an embodiment, editor component 304 may map features from sub-streams to optimal compression parameters for video and data. For instance, and without limitation, editor component 304 may receive features which are represented in a spatio-temporal domain and translate such features into encoder parameters. For example, editor component may receive a spatial feature of a frame that contains coordinates of positions of human faces and signals to encoder and/or encoding device 104 to use lower compression and/or lower quantization in a corresponding region, to preserve details; inversely, editor component 304 may signal to use higher quantizer in the rest of the frame, where such portions of the frame not as important as faces for a given end use as identified according to any process or means described in this disclosure, thus producing a video bitstream that may be significantly smaller in terms of data transmitted without any adverse effects to facial recognition for an end user and/or device.

Continuing to refer to FIG. 3, coding unit 120 may include, without limitation, a video compression component 308, which may be implemented in any manner suitable for implementation of any computing device, module, and/or component of encoding device 104 as described above. Video compression component 308 may be configured to receive original input video 108 together with optimal coding parameters as generated by editor component 304 and compresses video and audio sub-streams into one or more representations. Video compression component 308 may include without limitation an encoder as described in further detail below; encoder may accept parameters such as quantization factor, GOP size, frame type, or the like as input and may produce output as described below. Encoder may be configured to produce multiple video/audio outputs that may be subsequently processed as sub-streams. In some implementations, modifications to an encoder may be minimal; alternatively encoder may include a proprietary encoder built on top of a standard encoder core. In terms of operation, encoder may receive a single video input and multiple compression parameter sets, each of which may be applied for a separate output. For example, one parameter set may compress only parts of a video that contain conversation, defined for example as a combination of voice and faces, while discarding all other frames. Another set may encode regions of a video that contain objects and compress to maximum everything that is labeled as background. The above-described two outputs may then be produced and/or output as two sub-streams that allow an end user and/or end user device to pick and/or decode only a sub-stream that is relevant to a use case corresponding to end user and/or end user device; for instance one user and/or device may be interested in people and conversations, while another user and/or device may be looking for cars in a video. Persons skilled in the art, upon reviewing the entirety of this disclosure, will be aware of various other examples that may be considered to be within the scope of this disclosure.

Still referring to FIG. 3, coding unit 120 may include, without limitation, a data compression component 312, which may be implemented any manner suitable for implementation of any computing device, module, and/or component of encoding device 104 as described above. Data compression component 312 may be configured to receive an edited metadata sub-stream and compress the edited metadata sub-stream into one or more representations. For instance, and without limitation, one representation may include a low-resolution video and another representation may include a high-definition video; end user and/or end user device may select one representation at any particular time. In this sense "sub-stream" and "representation" may be treated as synonymous. Concretely, data compression component 312 may receive metadata related to a conversation in a video and compress it into a suitable subtitle representation. A principal function of this component may be to compress input metadata into a standard metadata representation, using as few bits as possible, for instance and without limitation using entropy coding.

With further reference to FIG. 3, coding unit 120 may include a bitstream generator 316, which may be implemented any manner suitable for implementation of any computing device, module, and/or component of encoding device 104 as described above. In an embodiment, bitstream generator 316 may be configured to receive compressed video and data representations from compression components and generate output bitstream 124.

Figure 4:
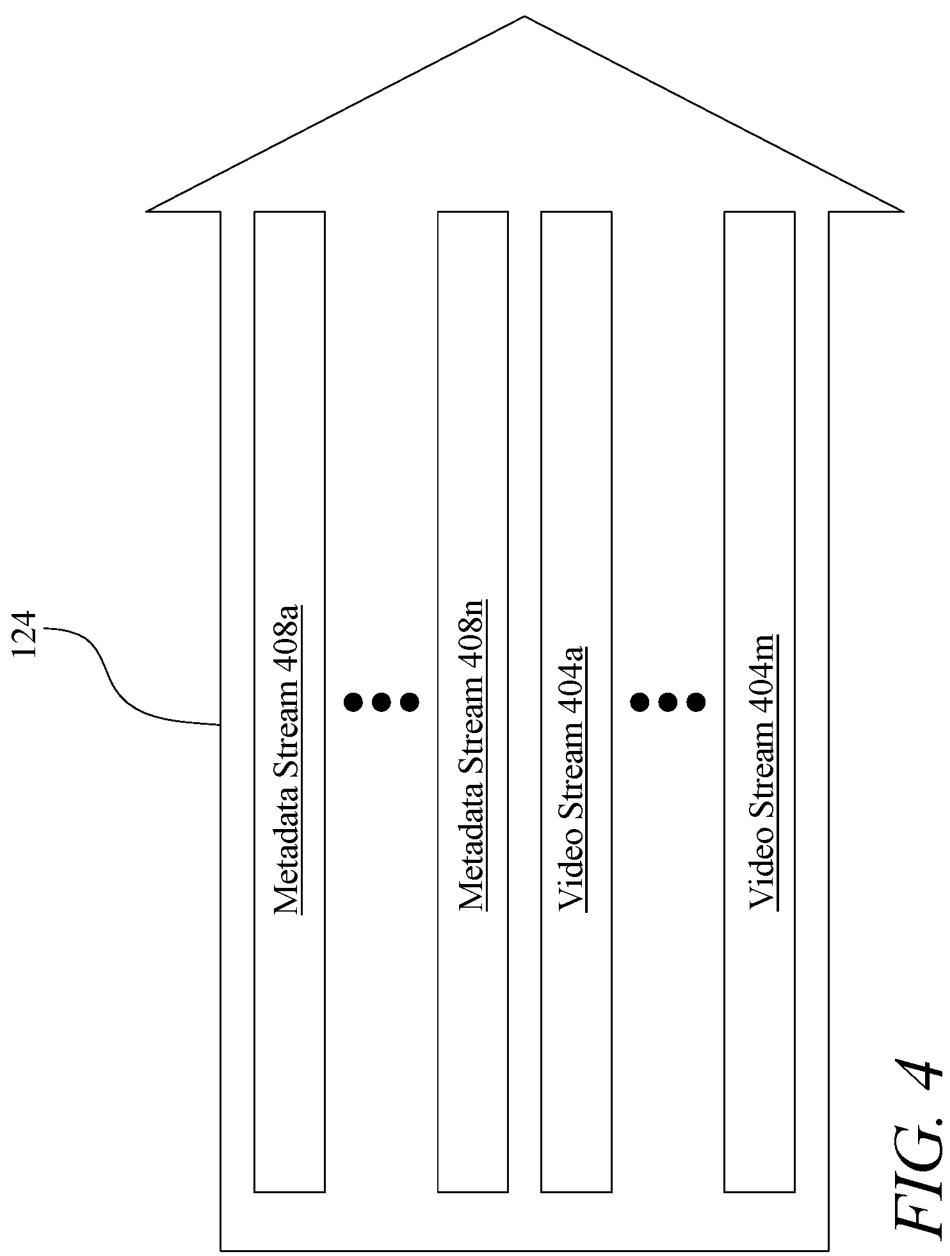
FIG. 4 is a schematic diagram illustrating an exemplary embodiment of a bitstream.

Referring now to FIG. 4, output bitstream 124 may include a plurality of sub-streams 404*a-m* that represent distinct levels of data and video. In a non-limiting example, metadata sub-streams 408*a-m* may differ from one another in a level of detail described; metadata sub-streams may differ from one another in selection of details included, with different metadata sub-streams including different combinations of details such as object detection and/or object identification, object count, face detection and/or face identification, person count, and/or other details that may occur to persons skilled in the art upon reviewing the entirety of this disclosure. Different levels and/or selection of details may, in some embodiments, be a result of different neural network configurations, such configurations including pruned sub-network parameters in one layer and complementary data for the complete structure in another, or the like.

As a non-limiting example, video streams may contain different level of details for a region of interest (ROI) and for background texture; for instance, video streams may contain high level of details for ROI and low level of details for background in one layer and complementary data for background texture in another layer, or the like. Output bitstream 124 may carry information about each sub-stream of plurality of sub-streams, for instance in the form of a header that may be parsed by a receiving decoder or other device or component.

Figure 5:
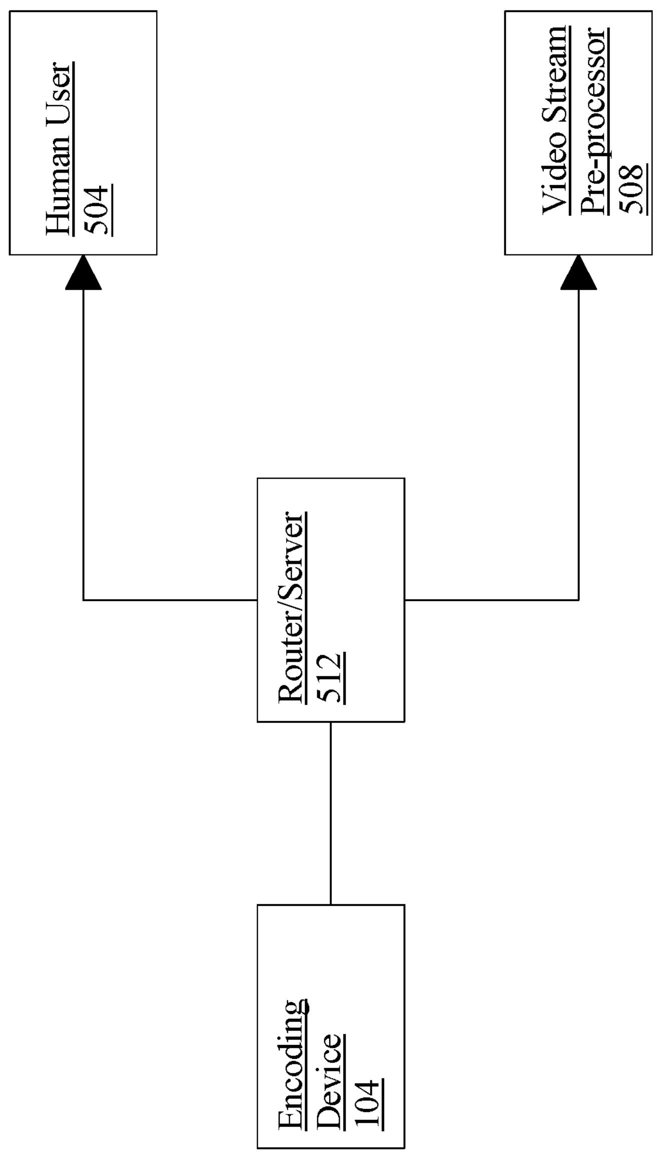
FIG. 5 is a block diagram illustrating an exemplary embodiment of an encoding device.

Referring now to FIG. 5, a potential user and/or receiving device of an output bitstream 124 may be able to decide to receive the complete output bitstream 124 or some of its components. As a non-limiting example, a human user 504 may request a video sub-stream for visual consumption, while a separate machine terminal 510 may request only a metadata sub-bitstream for automatic analysis. Video sub-stream may contains video and audio data, while metadata sub-stream may contain annotations, features, neural network configuration, and similar data that can be used by a machine terminal such as a router and/or server 515 for tasks such as detection, recognition, or the like. In some embodiments, machine terminal may use a metadata sub-stream to modify and/or enhance a video sub-stream being displayed to a human user.

Figure 6:
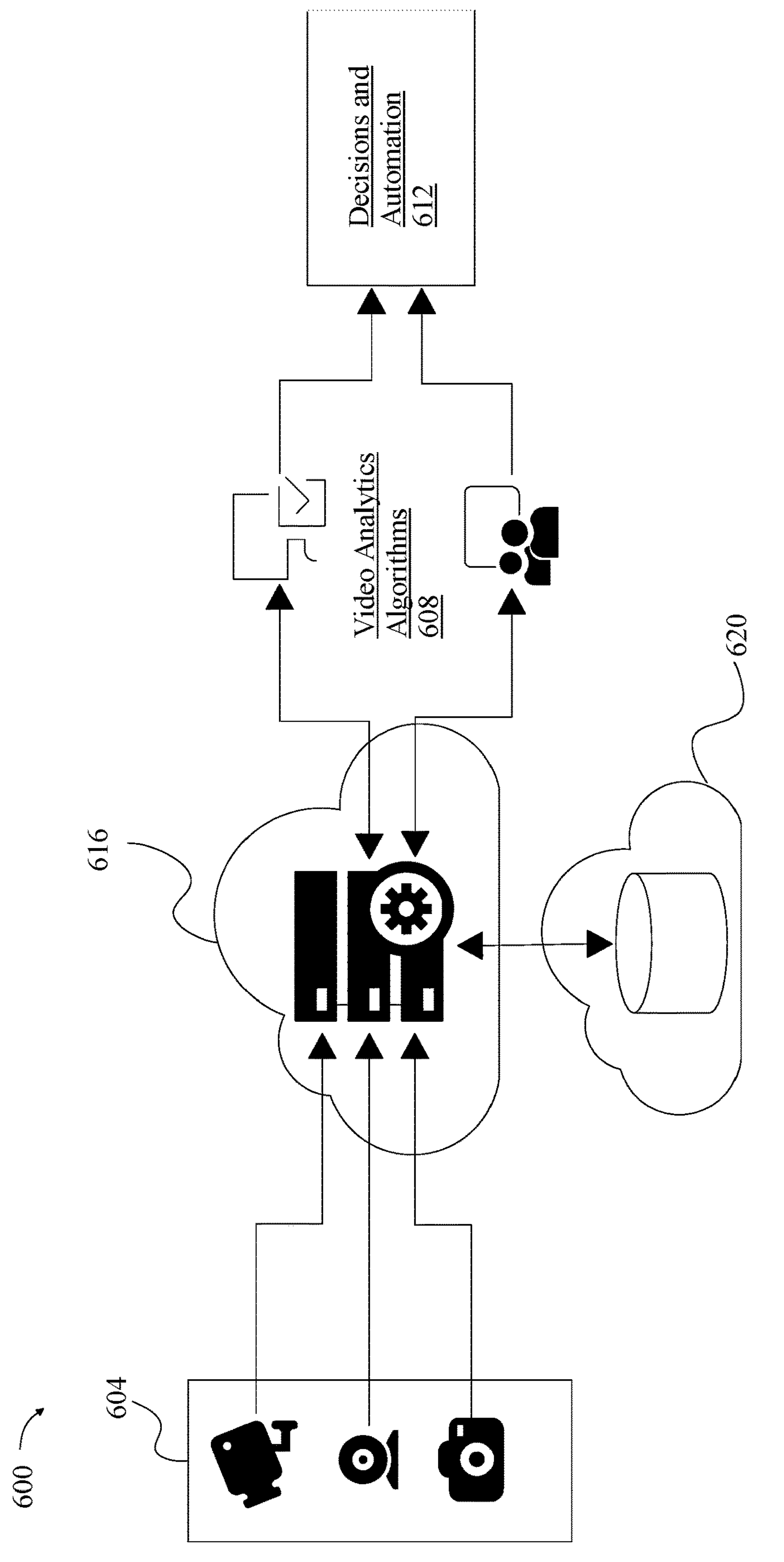
FIG. 6 is a block diagram illustrating an exemplary embodiment of a Video Internet of Things.

Referring now to FIG. 6, a non-limiting example of an embodiment of an Internet of Video Things (IoVT) 600 is illustrated. As used in this disclosure, is a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash., and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure. A "IoVT," as used in this disclosure, is an IoT that uses data included in, included with, and/or extracted from video files, streams, recordings, and/or data that is captured using video recording devices.

Still referring to FIG. 6, in a non-limiting example, video feeds from video sources 604 may be stored, streamed to a cloud, and/or analyzed by video analytics algorithms 608; for instance, and without limitation, analytics algorithms may include methods and/or method steps as described above for analysis unit 112. Some video feeds may be intended for human operators for monitoring and/or assessment. A video source and/or video feed may be monitored and/or received by one or more persons, for instance by a display as described in this disclosure, and/or may be monitored and/or received by one or more devices, machines, and/or algorithms as described in this disclosure; the same video source and/or stream may be monitored by both humans and device, machines, and/or algorithms 612. Video encoding systems 616 disclosed in this invention may encode videos and/or extracted, detected, and/or computed video features in a bitstream, for instance and without limitation as described above. Bitstream may be structured to allow extraction of sub-bitstreams that may be used for a specific application or set of applications. Where bitstream and/or sub-streams are received by devices, machines, and/or algorithms, such devices, machines, and/or algorithms may be trained to use video features as input and perform an application-specific task such as vehicle counting or face detection. One or more elements of data, video data, and/or metadata may be stored in storage 620, which may include any database or related component and/or device described in this disclosure.

Figures 7, 8:
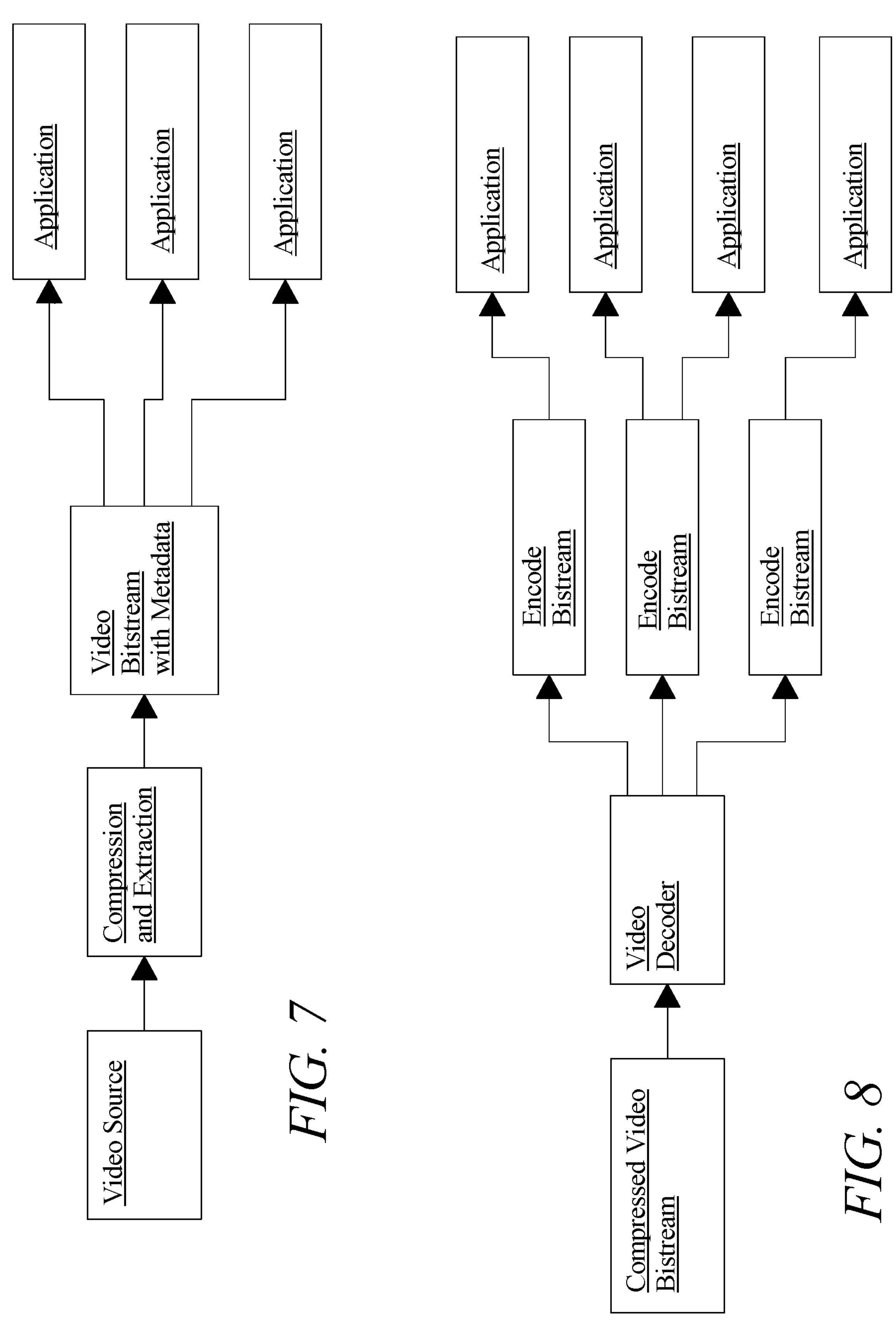
FIG. 7 is a block diagram illustrating an exemplary embodiment of bitstream application.
FIG. 8 is a block diagram illustrating an exemplary embodiment of bitstream application.

Referring now to FIG. 7, an exemplary embodiment demonstrating multi-application support for a single video bitstream is illustrated. In an embodiment, the same video bitstream may be used by different applications performing video analytics and/or monitoring tasks. Video monitoring by human operators, people counting by a machine, face recognition by a security application may be non-limiting examples of applications that use video input. A single video may be used by two different applications performing the same task, such as people counting applications from two different vendors, each using a different proprietary feature set; each application in these cases may require a specific set of features and may use its own feature extraction from a video input to perform one or more analytics tasks using that set of features. Each application may be trained ahead of time, using a machine learning algorithm as described in this disclosure, including without limitation a neural network, neural network parameter set, and/or neural network configuration, using a set of features appropriate for an associated task.

Application specific feature extraction may rely on an input bitstream enabling such feature extraction. A bitstream input to an application, when decoded and/or processed, may be used to extract features needed for a specific application. Since features required by an application, and a bitstream able to support such features, are application dependent, applications do not need all features and/or information included in a standard compressed video bitstream. It may thus be advantageous to create video bitstreams from which application specific bitstreams and/or sub-streams may be produced to include primarily information required to extract features needed by a given application and exclude all video feature information not needed for that specific application. In an embodiment, and without limitation, encoding device 104 may receive an indication of at least a feature for use by a receiving device performing an application as described above. Indication may be entered by user configuring encoding device 104; alternatively or additionally, a remote device may transmit, to encoding device 104, an indication of one or more required by the remote device, where such transmission may be signaled in any suitable form of electronic communication that may occur to persons skilled in the art upon reviewing the entirety of this disclosure.

Referring now to FIG. 8, an exemplary illustration of application-specific bitstream creation using transcoding is provided. Application specific bitstreams may be produced by an operation, referred to herein as "transcoding," in which a traditionally compressed video such as without limitation using h.264 video compression is decoded and then re-encoded to produce a bitstream customized for use by specific application; such an application-specific bitstream may omit one or more features not required for a corresponding application, while including features required for the corresponding application. In some embodiments, a re-encoded bitstream may include only features required for a corresponding application. For example, a re-encoded bitstream may only have motion data that may be used by applications that only need motion data. In such cases, a bitstream containing only motion data may be used to perform motion analysis; applications that receive such bitstream may not be able to reconstruct the videos for viewing as is done in a traditional decoder. This method of producing from a video a bitstream that only includes features specific to an application such as motion features has several distinct advantages: such an application-specific bitstream may require far less data to be transmitted than would be required for a more conventional video bitstream and may have an added benefit of preserving privacy by excluding information that allows reconstruction of source video. Such a system may be used, for example, to monitor residents at an elder care center and use only a motion information bitstream or sub-bitstream to detect when a person falls down or otherwise experiences an emergency detectable from motion. A bitstream and/or a set of sub-bitstreams created from a video may be created in such as a way to prevent pixel reconstruction necessary for human consumption. This ability to prevent pixel reconstruction or prevent identification of video contents may enable enhanced privacy in monitoring applications.

Figures 9, 10A, 10B:
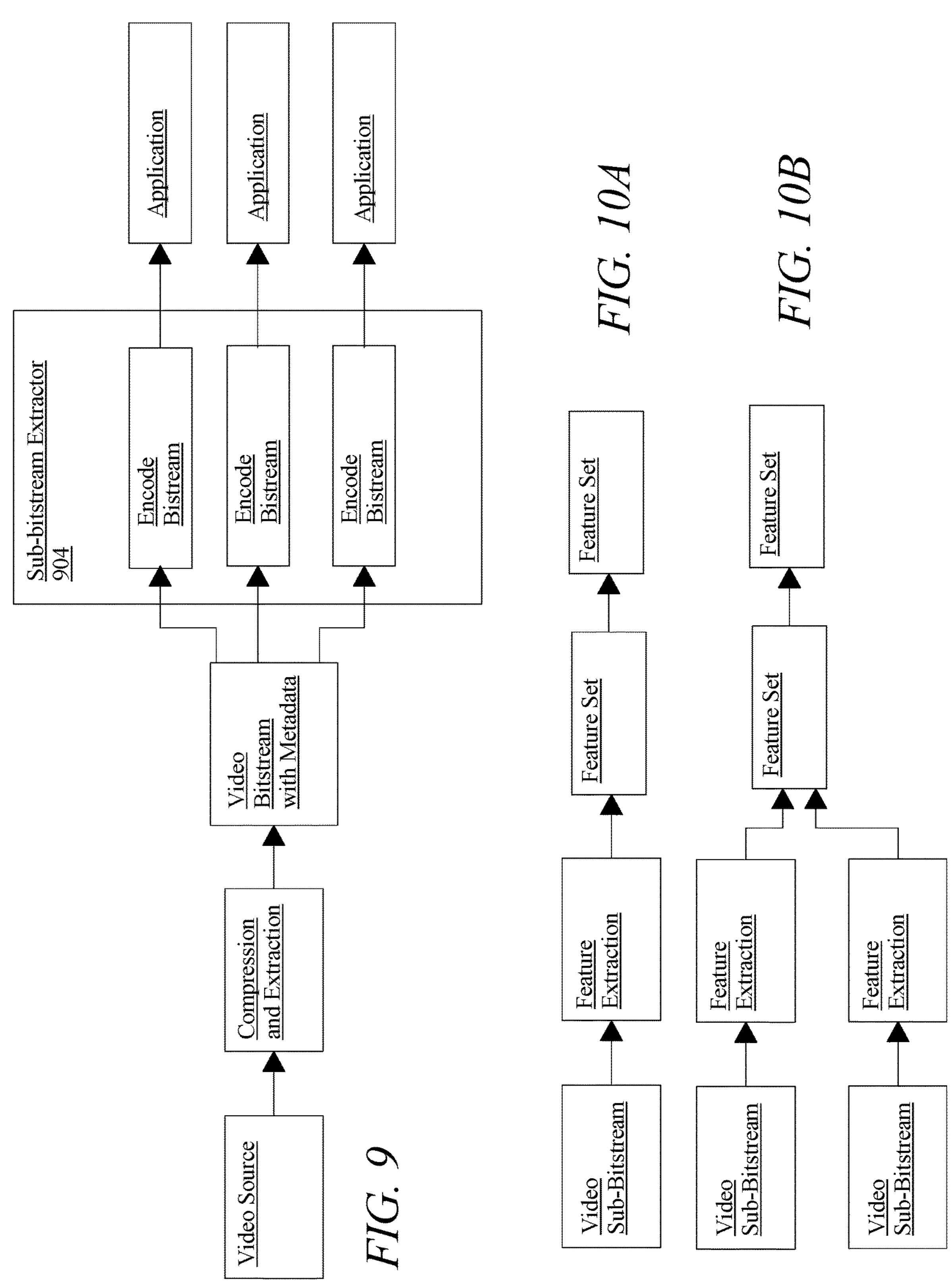
FIG. 9 is a block diagram illustrating an exemplary embodiment of bitstream application.
FIG. 10A is a block diagram illustrating an exemplary embodiment of bitstream application.
FIG. 10B is a block diagram illustrating an exemplary embodiment of bitstream application.

Referring to FIG. 9, an exemplary embodiment of application-specific bitstream creation using sub-bitstream extraction is illustrated. An application-specific bitstreams may be extracted using an operation such as parsing and extraction. An input bitstream may be specifically created to include and signal specific bitstream information that may be extracted to a sub-bitstream. For example, a parsing and extraction operation may extract motion related data to form a sub-bitstream that can be used by applications that only need motion data. A sub-extractor 904 may use any process for extraction of features for inclusion in a sub-bitstream, such as without limitation output of a neural network or other machine-learning model and/or process, as described in this disclosure, for identification of features. A sub-bitstream extractor may have an ability to produce sub bitstreams that cannot be used to reconstruct pixels necessary for human observers to understand and identify contents. For example, a sub-bitstream containing only motion information of blocks may be used to perform motion analysis and but may be impossible and/or practically infeasible to use to identify scene contents and recover pixel information. This ability to prevent pixel reconstruction or prevent identification of video contents may help to ensure privacy in monitoring applications.

Still referring to FIG. 9, in an embodiment encoding device 104 may receive one or more identifications of features required for an application. Encoding device 104 may select a neural network, machine-learning model, and/or machine-learning process based on one or more identifications of features; for instance, and without limitation, encoding device 104 may maintain and/or access a database linking features to identifications of neural networks, machine-learning models, and/or machine-learning processes. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database.

Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. A single neural network, machine-learning model, and/or machine-learning process may extract and/or identify two or more features required by an application; in some embodiments, all features required by an application may be identified and/or extracted by a single neural network, machine-learning model, and/or machine-learning process. In some embodiments, at least a first feature required by an application may be identified and/or extracted by a first neural network, machine-learning model, and/or machine-learning process, while at least a second feature required by the application may be identified and/or extracted by a second neural network, machine-learning model, and/or machine-learning process.

Encoding device 104 may select each required and/or indicated neural network, machine-learning model, and/or machine-learning process and execute each neural network, machine-learning model, and/or machine-learning process as described above, including using dedicated hardware for execution of neural networks as described above; this may be performed in series and/or in parallel. In an embodiment, retrieval and/or instantiation of one or more neural networks may be time synchronized; for instance, a first model may be used from time t to time t+n, while a second model may be used from time t+n until time t+n+m. A choice of and/or input to a model may depend on an output from a previously executed model. Alternatively or additionally, a model previously run may be chosen because its output is an input to a model selected to generate a desired feature or other data element. Two or more models may be run in parallel, for instance, if neither model requires an input from the other model; selection of models to be run in parallel may be made to perform pipelining or interleaving for more efficient production of results, and/or because both models generate outputs which are required as inputs to a subsequently run model. Persons skilled in the art, upon reviewing the entirety of this disclosure, will be aware of various ways in which neural networks and/or other models may be run in series and/or in parallel, each of which is considered to be within the scope of this disclosure.

Referring now to FIG. 10A, an illustrative example of feature extraction from application-specific sub-bitstreams is provided. In an embodiment, a video bitstream and/or sub-bitstream may be used by an application that uses features from the bitstream; this specific application may be trained to use features that are included in and/or may be extracted from the bitstream. Feature extraction process may include decoding features included in a bitstream and computing additional features using one or more features decoded from the bitstream.

FIG. 10B illustrates an exemplary embodiment of a case in which two video sub-streams are used by an application that uses features from the two sub-streams. Application may be trained to use features that can be extracted from a first sub-stream and a second sub-stream. In general, applications may need one, two, three, or more sub-streams. Feature extraction process may include decoding features included each sub-stream and computing additional features using one or more features decoded from each sub-stream.

Figures 10C, 11:
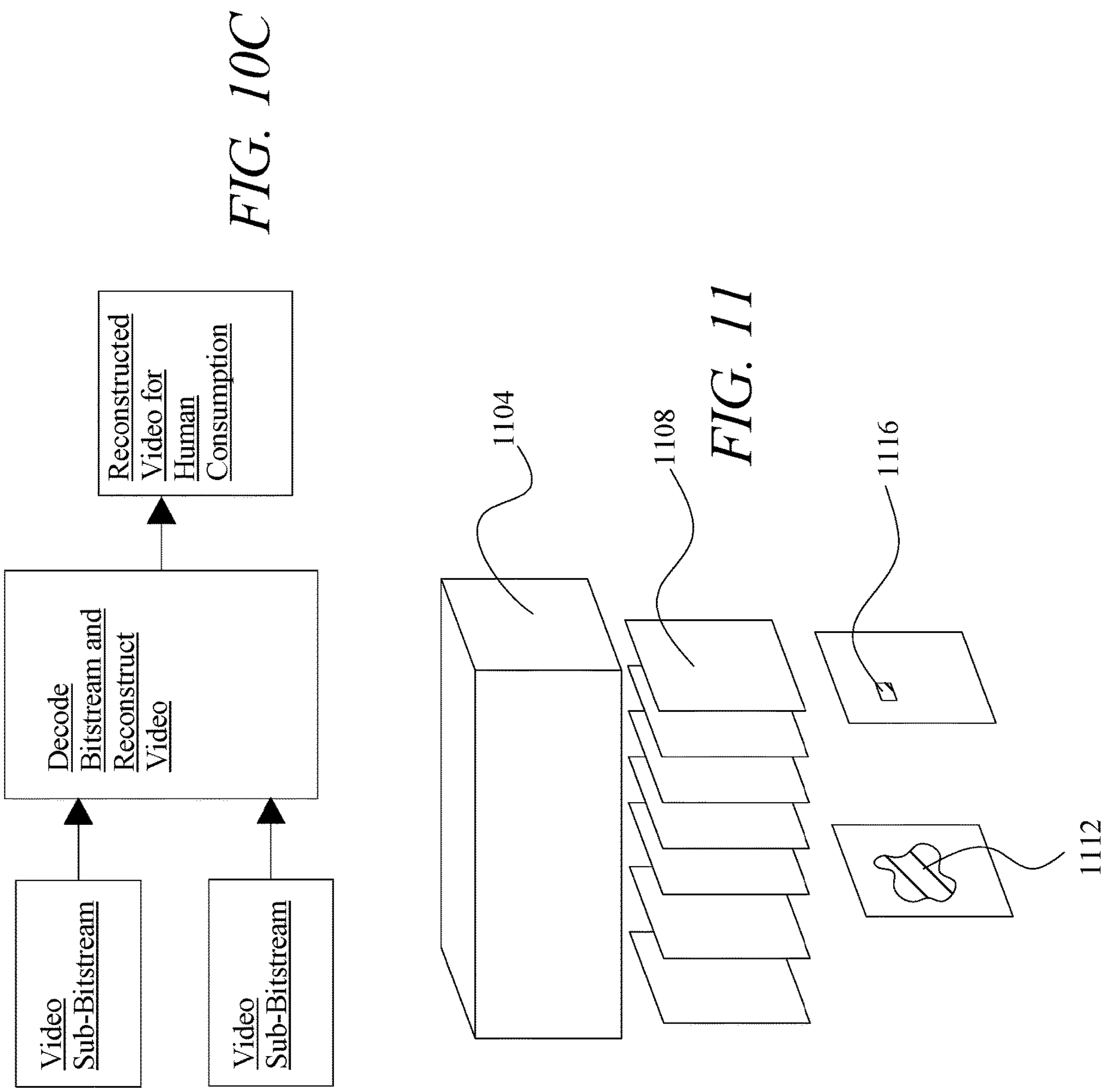
FIG. 10C is a block diagram illustrating an exemplary embodiment of bitstream application.
FIG. 11 is a block diagram illustrating an exemplary embodiment of a video.

FIG. 10C illustrates an exemplary embodiment where two video sub-bitstream are used to decode and reconstruct a video for human consumption. In this case a decoding operation may produce pixel output for display on a monitor and traditional viewing and use by human operators; decoding may be performed, without limitation, as described below. Video may be reconstructed using one sub-stream and/or a plurality of sub-streams.

Referring to FIG. 11, embodiments described in this disclosure may involve implementation and/or performance of one or more processes of video compression. As used in this disclosure, video compression is a process for removing redundancy and compressing a video 1104. Video compression methods may use motion compensation to reduce temporal redundancy, transform coding to reduce spatial redundancy, and entropy coding methods such as variable length coding and/or binary arithmetic coding to reduce statistical redundancies in symbols/parameters produced by motion compensation and/or transform coding. In a typical video compression system, a frame 1108 of a video may be divided into non-overlapping blocks and each block may undergo motion compensation and/or transform coding followed by entropy coding. A transform coding stage may reduce spatial redundancies and may essentially be characterized as encoding texture in video. A quantization stage may follow transform coding where transform coefficients may be quantized into fewer levels. A quantization stage may add loss and/or distortion to transform coefficients. A similar quantization process may also be used to quantize motion information (e.g., motion vectors) and include information at various levels of accuracy. Motion vectors and transform coefficients may be coded with different levels of quantization.

Still referring to FIG. 11, a video 1104 may be made up of a plurality of frames 1108. Each frame may be encoded as an optional set of spatial regions 1112. A spatial region 1112 may be an entire frame. When a frame is divided into more than one spatial region, region identifiers may be used at block level to signal spatial regions to which a block 1116 belongs. Each block 1116 may be a non-overlapping set of pixels; that is, pixels of one block may not overlap with other blocks in a given characterization and/or division of a video. Blocks may have any shape including without limitation a rectangular shape. A block 1116 may be sub-divided into smaller sub-blocks. Each of sub-blocks may be further sub-divided into smaller sub-blocks. One reason for such sub-division may be to identify blocks that belong to a single spatial region or identify blocks where all pixels of a block 1116 have the same or similar feature such as motion, luminance, or color. Another reason for such partition may be to achieve a more efficient representation that reduces bits required for the representation. Outputs of neural networks, machine-learning models, and/or machine-learning processes may identify blocks, sub-blocks, and/or other units of video data corresponding to and/or containing features.

Figures 12, 13:
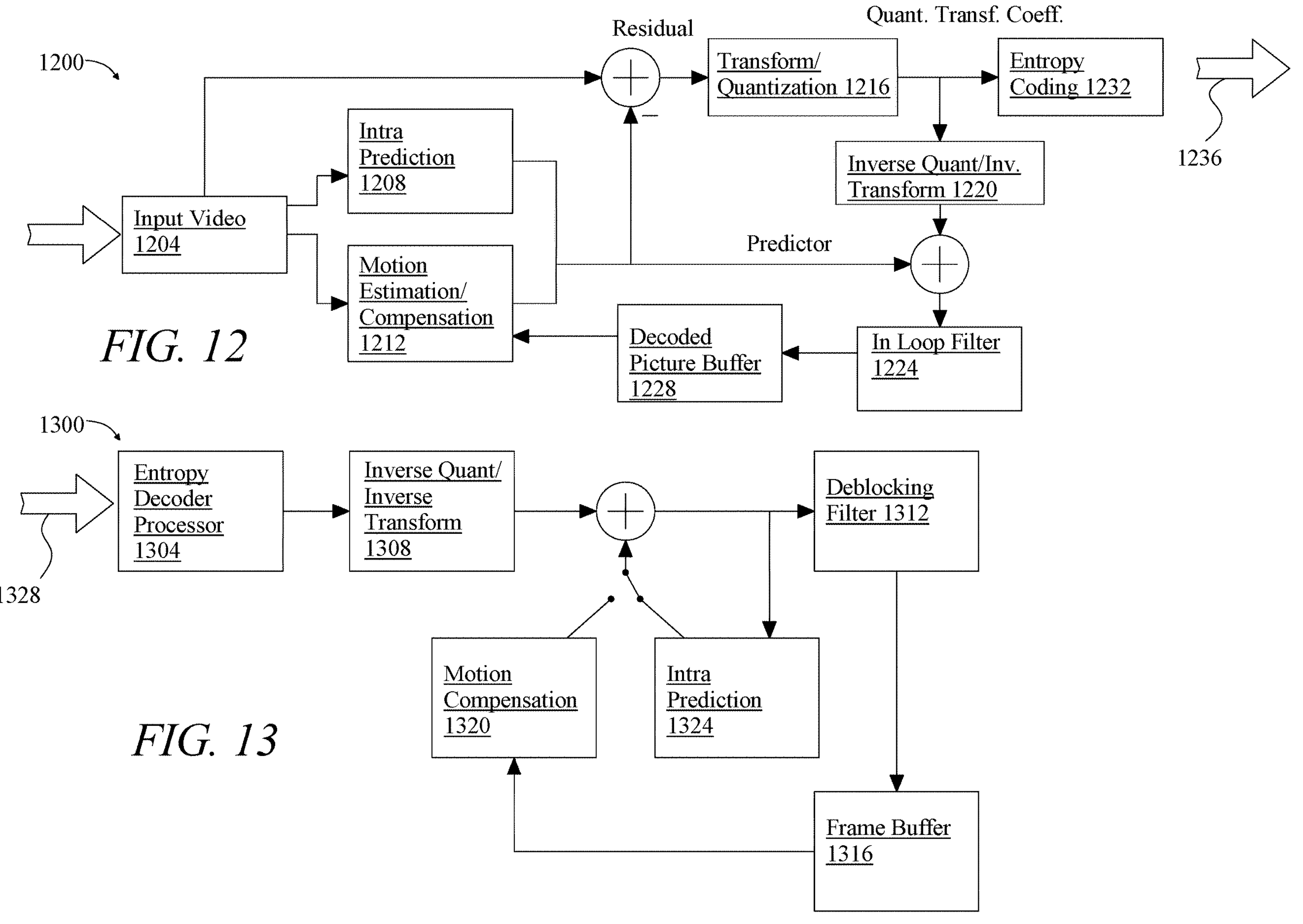
FIG. 12 is a block diagram illustrating an exemplary embodiment of an encoder.
FIG. 13 is a block diagram illustrating an exemplary embodiment of a decoder.

FIG. 12 is a system block diagram illustrating an exemplary embodiment of a video encoder 1200 capable of constructing a motion vector candidate list including adding a global motion vector candidate to the motion vector candidate list. Example video encoder 1200 may receive an input video 108 1204, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding unit 120*s* (CU). A final result of this portioning may include a group of sub-blocks that may be called predictive units (PU). Transform units (TU) may also be utilized.

Still referring to FIG. 12, example video encoder 1200 may include an intra prediction processor 1208, a motion estimation/compensation processor 1212, which may also be referred to as an inter prediction processor, capable of constructing a motion vector candidate list including adding a global motion vector candidate to the motion vector candidate list, a transform/quantization processor 1216, an inverse quantization/inverse transform processor 1220, an in-loop filter 1224, a decoded picture buffer 1228, and/or an entropy coding processor 1232. Bit stream parameters may be input to the entropy coding processor 1232 for inclusion in the output bit stream 1236.

In operation, and with continued reference to FIG. 12, for each block of a frame of input video 108 1204, whether to process block via intra picture prediction or using motion estimation/compensation may be determined. Block may be provided to intra prediction processor 1208 or motion estimation/compensation processor 1212. If block is to be processed via intra prediction, intra prediction processor 1208 may perform processing to output a predictor. If block is to be processed via motion estimation/compensation, motion estimation/compensation processor 1212 may perform processing including constructing a motion vector candidate list including adding a global motion vector candidate to the motion vector candidate list, if applicable.

Further referring to FIG. 12, a residual may be formed by subtracting a predictor from input video 108. Residual may be received by transform/quantization processor 1216, which may perform transformation processing (e.g., discrete cosine transform (DCT)) to produce coefficients, which may be quantized. Quantized coefficients and any associated signaling information may be provided to entropy coding processor 1232 for entropy encoding and inclusion in output bit stream 1236. Entropy encoding processor 1232 may support encoding of signaling information related to encoding a current block. In addition, quantized coefficients may be provided to inverse quantization/inverse transformation processor 1220, which may reproduce pixels, which may be combined with a predictor and processed by in loop filter 1224, an output of which may be stored in decoded picture buffer 1228 for use by motion estimation/compensation processor 1212 that is capable of constructing a motion vector candidate list including adding a global motion vector candidate to the motion vector candidate list.

With continued reference to FIG. 12, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like). In some implementations, and still referring to FIG. 12, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding unit 120 level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 12, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Still referring to FIG. 12, in some embodiments encoding device 104 and/or an encoder may signal spatial regions of a video. A video frame may be divided into spatial regions of semantic significance to enable certain analytic applications and processing by machines. For example in a video of an outdoor scene, sky in the background may be a spatial region. Another example may include separating a video into foregroundand background. In some applications, where encoding device 104 has identified faces as part of feature extraction, each face may be represented as a separate spatial region. A default spatial region may include an entire frame. Each spatial region may have a unique identifier, such as without limitation a globally unique identifier (GUID) and/or universally unique identifier (UUID); alternatively or additionally, identifier may be unique within a given video stream, sub-stream, and/or group of pictures.

In an embodiment, and still referring to FIG. 12, encoding device 104 may be configured to accept an input video 108 having a first data volume and identify at least a region of interest in the input video 108, where region of interest may have any feature of interest, which may be identified according to any process described in this disclosure; for instance, and without limitation, a remote device may signal to encoding device 104 one or more features of interest and/or importance for an application as described above, and encoding device 104 may identify one or more regions of interest containing the one or more features of interest and/or importance.

Encoding device 104 may then generate a sub-stream and/or bitstream signaling such regions of interest, for instance and without limitation using spatial region identifiers. Sub bitstreams extracted may have no spatial region IDs when the target machine application does not need region information for performing its tasks. Blocks may be associated to regions with spatial region identifiers.

Still referring to FIG. 12, a spatial region label may be added for each region signaled in a bitstream. A "spatial region label," as used in this disclosure, is a text descriptor such as without limitation "face," "car," "foreground," "background," or the like. A spatial region label may be signaled once in picture header or a header common for a group of frames such as a sequence header or sequence parameter set. Encoding device 104 may alternatively or additionally signal at block and/or spatial region level to indicate one or more labels contained in such blocks and/or spatial regions. Encoding device 104 may signal if a given frame includes a feature of interest; for instance, encoding device 104 may signal if a frame includes a face, skin, a vehicle, or the like. Encoding device 104 may signal and/or indicate semantics information in a frame, where semantics information may describe objects and/or relationships among objects. For instance, and without limitation, a scene may have objects such as a sofa, a television, a desk, or the like, and may be semantically described as a living room and/or an indoor scene. Different levels of semantics may be used to describe different aspects of a scene and/or picture; for example, one level of semantics may describe an overall scene, while another may describe a region and/or detail of the scene, and the like. Content analysis that is performed ahead of or as a part of video compression may identify spatial region labels as described above. Division into sub-streams may include detection of signals of regions and/or temporal regions of interest or the like by encoding device 104 as described above, and/or by a receiving device based on signaling from encoding device 104, and identifying sub-stream as containing a required and/or otherwise specified feature and/or set of features. Encoding device may alternatively identify a region of exclusion, identified as a region containing a feature to be excluded from a bitstream and/or sub-stream to be transmitted, for instance for reasons of privacy and/or security.

Still referring to FIG. 12, encoding device 104 may be configured to signal regions and/or blocks of interest and/or exclusion by signaling features in video blocks. For instance, and without limitation, encoding device 104 may include a datum in a bitstream and/or sub-stream indicating a block start code, an offset to a block position as identified by pixels from a corner and/or other reference point and/or origin of a frame, or the like. This may allow for quick access to block level data without decoding prior blocks. Still referring to FIG. 12, each non-overlapping block of a video frame may be divided into sub-blocks using a known method such as quad tree block partitioning. Blocks and/or sub-blocks may be sub-divided until sub-blocks have similar spatial characteristics. Traditional video encoding such as H.264 and H.265 uses block-based coding where blocks are typically coded in a raster scan order (left to right and top-to-bottom). During decoding blocks may be decoded in order. This means decoding block N of a video slice may require decoding all blocks before block N. Extracting data that corresponds to block N may thus require parsing all prior blocks and decoding block N may not be possible without decoding blocks 1 to N−1. For example, an application that requires only block N still may have to process all the blocks before N. A flexible bitstream that allows access to blocks, using block signaling, may be advantageous.

Start code such as 32-bit start codes as used in MPEG-2video may be used. Block header may include without limitation the following elements: (1) block type; (2) region identifier, (3) privacy flag; (4) coding type; (5) motion data; (6) texture data; and/or (7) color data. Further referring to FIG. 12, block type may signal a type of information in an instant block. A fixed character number block type field, such as a four-character block type field, may be used to signal different types of blocks. This field may be used to signal semantics of block contents. For example, block type may signal that the block is part of a face by setting a block type value to FACE. A set of pre-defined block types may be defined to capture a set of commonly found objects. Table 1, below, lists exemplary block types that may be employed in a non-limiting, exemplary embodiment:

| Object | Block type code |
|---|---|
| Human face | FACE |
| Fruit | FRUT |
| Motor vehicle | AUTO |
| User defined object | UDEF |

When object type is user defined type (UDEF), it may be followed by a unique 128-bit object type. A value such as the Globally Unique Identifier (GUID) may be used to avoid name conflicts across services.

With continued reference to FIG. 12, in videos where a frame is partitioned into multiple spatial regions, a region identifier included in a block header may map a spatial region a corresponding block belongs to. Region identifier may not be used in videos where spatial regions are not used.

Still referring to FIG. 12, when a privacy flag set to 1, the privacy flag may indicate that the block has private information; this may be used by encoding device 104 and/or a recipient device to filter out regions of exclusion. For instance, and without limitation, to preserve privacy, sub-bitstreams provided to machine services may exclude blocks with privacy flag set to 1. When privacy flag is set to 0, a block may not contain any privacy-revealing information. Managing private information may be handled, in some embodiments, according to service privacy rules.

With further reference to FIG. 12, block coding type may signal information needed and/or useful for decoding a block. Block coding type may include without limitation inter, intra, and/or independent. Inter blocks may information from previously decoded frames to more efficiently represent information in a current block. Intra blocks may use information from previously decoded blocks in the current frame to more efficiently represent information in the current block. A block type of ‘independent’ signals that a corresponding block does not use information from other blocks and is to be independently decoded.

Still referring to FIG. 12, motion data of a block may include motion information such as motion vectors, optical flow, or the like. Local and/or global motion may be included in motion vector data. Motion data may include translational motion or affine motion data.

Further referring to FIG. 12, Texture Data may represent a texture of a block. A transform such as the DCT may be used to represent texture. In such cases, texture may be compressed more efficiently using compression techniques such as intra block prediction.

Still referring to FIG. 12, color data may represent a color of a block. A method such as a color histogram may be used to represent color of a block. In some cases, where a block has single color, a more efficient way may be to signal the color components of that specific color. For example, RGB color representation may be used to represent color. Other color formats are possible, as may occur to persons skilled in the art upon reviewing the entirety of this disclosure.

Continuing to refer to FIG. 12, identification of a region, block, and/or set of blocks of interest may include identification of a region having a given type of motion data. For instance, and without limitation, a region, block, and/or set of blocks having a given type or element motion data may be signaled in a bitstream, enabling decoding of just those regions, blocks, and/or sets of blocks. Including a way to separate motion data without decoding the bitstream allows for fast extraction of sub-bitstreams. Specifying motion data size, in blocks, pixels, or other measurements, allows extracting only motion data in block and discarding texture data for specific applications. Similarly, texture data size may allow fast extraction of texture data bitstream. Alternatively, unique start codes for block motion data and block texture data may be used.

Still referring to FIG. 12, a block may have user defined features; such features may be signaled using a header that identifies user defined features, feature size, and feature data. Block level identification of such data may allow easy extraction of specific feature data as a sub bitstream. User defined features may include features that are input to neural networks at a receiver. Multiple neural networks may be trained with each network producing decisions that the network is trained on. Neural networks may use all or a subset of features computed from an edge device. Examples of neural networks include any neural networks as described in this disclosure, including without limitation convolutional neural networks, auto encoders, adversarial GNN, and multi-layer neural networks.

Still referring to FIG. 12, in an embodiment, encoding device 104 may be configured to identify one or more temporal regions, such as without limitation one or more temporal regions of interest, in a video. A “temporal region,” as used in this disclosure, is a regions spanning time; a temporal region may include one or more frames and/or groups of pictures. Example of temporal regions may include without limitation scenes. Temporal regions may describe actions in a video over a period of time. For example, and without limitation, a temporal region may include a scene where a dog is chasing a ball; subsequent scene, which may be a different temporal region, may cut away from the dog and show the dog owner calling the dog.

With continued reference to FIG. 12, each temporal region may have different content and/or compression characteristics from each other temporal region. Content within a temporal region may not change much. There may be cases such as a scene where camera panning over a crowd at a stadium where boundaries of temporal regions are not clear and/or scene contents change within a temporal region. In an embodiment, encoding device 104 may identify temporal regions and/or boundaries therebetween by identifying temporal regions, such as sequences of frames, groups of pictures, or the like, containing one or more features of interest. For instance, and without limitation, where encoding device 104 has received an indication that human faces are features of interest, a sequence of frames containing human faces and/or a sequence of frames containing a specific human face of interest may be identified as a temporal region, and boundaries thereof may be frames that do not contain human faces and/or a specific human face of interest. Any feature of interest as described above, including audio features, motion, types of motion, or the like may be used to identify a temporal region of interest. A group of frames may be considered a temporal region when the frames have same contextual content. Temporal region may be defined by a single action, such as without limitation a person speaking, a person standing up, a person throwing a punch, or the like.

In an embodiment, encoding device 104 may be configured to signal a temporal region change. Some applications as described above may need only a sub-stream that has one key frame from a temporal region; for instance, an application counting temporal regions and/or features that temporal regions contain may only need one representative picture per temporal region. Alternatively or additionally, boundaries of temporal regions, such as temporal regions of videos without natural temporal region boundaries, such as surveillance video, live camera monitoring traffic, or the like, may be created at fixed intervals for instance and without limitation every 2 seconds, every 10 seconds, or the like. Temporal region duration selected for an application may take into account how content changes in video and select a time that is expected to keep region contents largely the same. Temporal region duration may, for instance, be set to a period within video in which motion, semantics information, regions of interest, metadata, and/or other detected and/or classified attributes remain within a threshold degree of similarity. Encoding device 104 may adaptively increase and decrease length of temporal regions based on activity measures, for instance by decreasing an interval whenever a change is detected and then slowly increasing the interval over time until a subsequent detection of change, for instance and without limitation as determined by detection of a change in video attributes exceeding some threshold.

Alternatively or additionally, and with further reference to FIG. 12, encoding device 104 may identify and/or signal temporal regions and/or boundaries thereof with absolute and/or real time; for instance, user instruction and/or instruction from a remote device may identify time period of interest, such as from 11 AM to 11:15 AM on Nov. 27, 2019. As a non-limiting example, in applications such as video surveillance, event time may have significance. Embedding real world time at temporal region boundaries, as identified for instance as described above, may allow applications to process regions relative to real world time.

Still referring to FIG. 12, a temporal region label may be added for each region signaled in a bitstream and/or sub-stream. Label may include a text descriptor, such as "running," "interview," or the like. A temporal region label may be signaled once in group of pictures header or a header common for a group of frames such as a sequence header or parameter set. Alternatively or additionally, encoding device 104 may signal temporal regions at a block and/or spatial region level. Encoding device 104 may signal if a frame and/or temporal region contains a feature of interest such as without limitation a face, a skin, a vehicle, or the like. Content analysis that is performed ahead of or as a part of video compression may identify temporal region labels.

In an embodiment, encoding device 104 may generate one or more sub-streams containing only temporal regions of interest for a given recipient device and/or person, or as otherwise identified as described above. Encoding device 104 may generate one or more sub-streams containing only boundaries between temporal regions of interest as described above.

With continued reference to FIG. 12, encoding device 104 may be configured to perform custom feature generation from standard features, where "standard features" include features defined for specific applications. Receivers may and/or receiving devices may require features that are designed for specific applications. Encoding device 104 may support this capability by using a computational tool such as a neural network or other machine-learning model that takes spatial and/or temporal features as input and outputs application specific features; neural network and/or machine-learning model may be configured using one or more machine-learning processes as described below and training data and/or training examples correlating spatial and/or temporal features to application-specific features, where training data, neural network, and/or machine-learning model may be indexed to, linked to, and/or classified to such application and/or receiver. Application-specific features may be produced at a block level where block level spatial and temporal features may be used as input, and/or atregion and/or group of blocks level where input features from a regions or group of blocks may be used to produce output features. Output features may be encoded and transmitted to the receiver or saved on encoding device 104.

Still referring to FIG. 12, if a neural network is used to produce custom features, the 10 neural network to be utilized may be selected from a set of neural networks already available on encoding device 104. In another embodiment, the neural network needed may be transmitted to encoding device 104 for use in custom feature generation. Trained neural network models may be stored using any suitable form and/or process for data encoding, including any formatting suitable for training data as described in further detail below, such as without limitation XML and/or binary representations. Such models may be loaded using an inference engine that executes models. For example, a neural network model may be compressed, for instance as a zip file or the like, and transmitted to the edge device. In some embodiments, a computational tool to produce application-specific features may be encapsulated in a software module such as a shared library. Such software modules may be loaded and used by encoding device 104 using application programming interfaces (APIs) or the like.

FIG. 13 is a system block diagram illustrating an example decoder 1300 capable of decoding a bitstream 1328 by at least constructing a motion vector candidate list including adding a global motion vector candidate to the motion vector candidate list. Decoder 1300 may include an entropy decoder processor 1304, an inverse quantization and inverse transformation processor 1308, a deblocking filter 1312, a frame buffer 1316, a motion compensation processor 1320 and/or an intra prediction processor 1324.

In operation, and still referring to FIG. 13, bit stream 1328 may be received by decoder 1300 and input to entropy decoder processor 1304, which may entropy decode portions of bit stream into quantized coefficients. Quantized coefficients may be provided to inverse quantization and inverse transformation processor 1308, which may perform inverse quantization and inverse transformation to create a residual signal, which may be added to an output of motion compensation processor 1320 or intra prediction processor 1324 according to a processing mode. An output of the motion compensation processor 1320 and intra prediction processor 1324 may include a block prediction based on a previously decoded block. A sum of prediction and residual may be processed by deblocking filter 1312 and stored in a frame buffer 1316.

Figure 14:
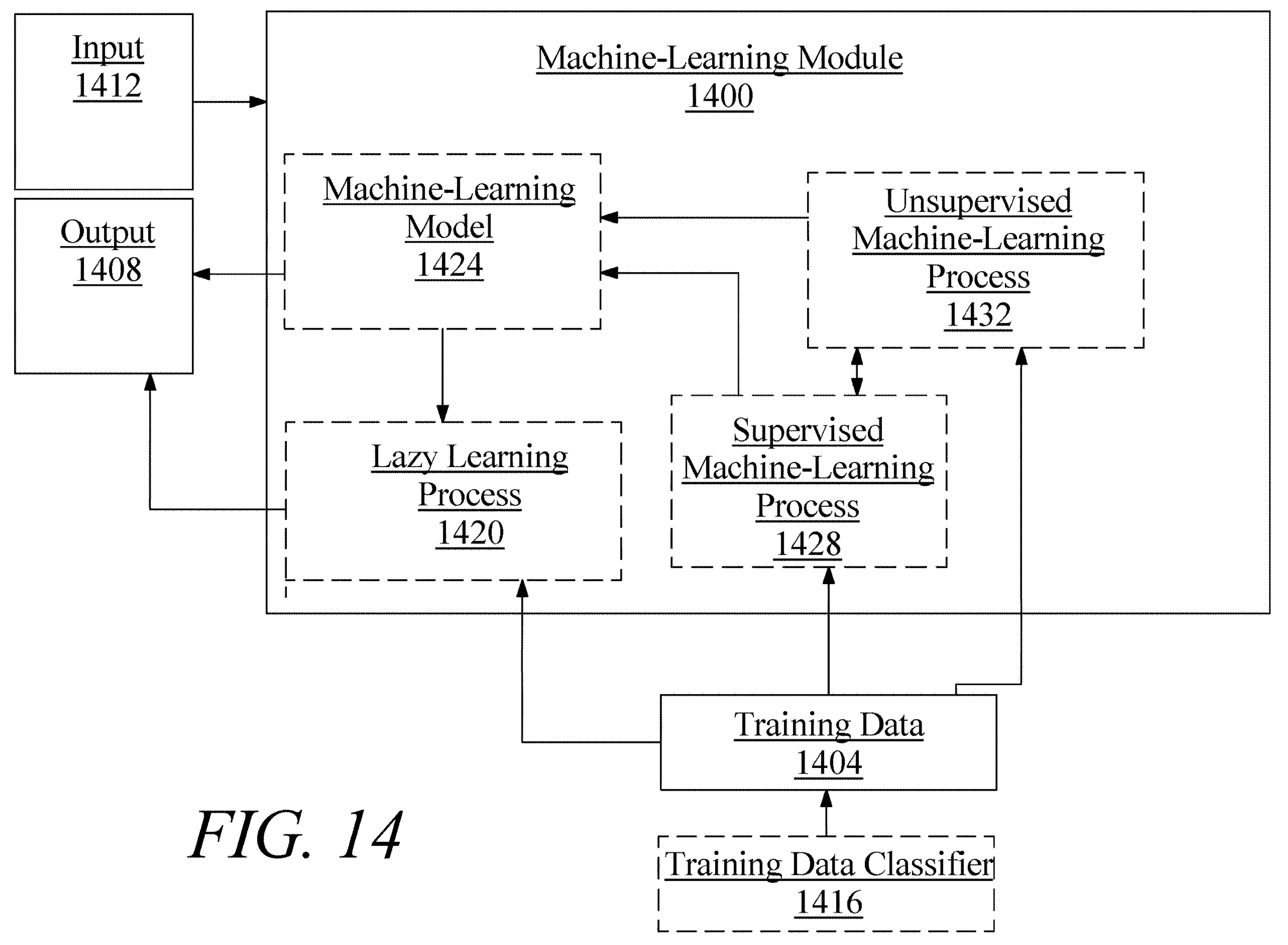
FIG. 14 is a block diagram illustrating an exemplary embodiment of a machine-learning module.

Referring now to FIG. 14, an exemplary embodiment of a machine-learning module 1400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1404 to generate an algorithm that will be performed by a computing device/module to produce outputs 1408 given data provided as inputs 1412; this is in contrast to a non-machine learning software program where the commands to be executed are determined in advance by a user and written in a programming language.

Still referring to FIG. 14, "training data," as used herein, is data containing correlations that a machine-learning process may use to model relationships between two or more categories of data elements. For instance, and without limitation, training data 1404 may include a plurality of data entries, each entry representing a set of data elements that were recorded, received, and/or generated together; data elements may be correlated by shared existence in a given data entry, by proximity in a given data entry, or the like. Multiple data entries in training data 1404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1404 according to various correlations; correlations may indicate causative and/or predictive links between categories of data elements, which may be modeled as relationships such as mathematical relationships by machine-learning processes as described in further detail below. Training data 1404 may be formatted and/or organized by categories of data elements, for instance by associating data elements with one or more descriptors corresponding to categories of data elements. As a non-limiting example, training data 1404 may include data entered in standardized forms by persons or processes, such that entry of a given data element in a given field in a form may be mapped to one or more descriptors of categories. Elements in training data 1404 may be linked to descriptors of categories by tags, tokens, or other data elements; for instance, and without limitation, training data 1404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 14, training data 1404 may include one or more elements that are not categorized; that is, training data 1404 may not be formatted or contain descriptors for some elements of data. Machine-learning algorithms and/or other processes may sort training data 1404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1404 to be made applicable for two or more distinct machine-learning algorithms as described in further detail below.

Training data 1404 used by machine-learning module 1400 may correlate any input data as described in this disclosure to any output data as described in this disclosure. For example, and without limitation, object information of a type that may be extracted from picture analyzer and/or speech/identity from audio may be correlated in training examples with one or more elements of metadata. Similarly, metadata information that describes contents and/or context may be correlated in training examples to or with audio and/or video object information. Object and/or feature data of a type that may be produced by video analyzer may be correlated in training examples to or with features and/or objects of types that may be detected by audio analyzer. Object and/or feature data of a type that may be produced by audio analyzer may correlated in training examples with or to features and/or objects of types that may be detected by video analyzer. Training data and/or training examples may include any elements suitable for identifying metadata, video and/or visual data, and/or audio data, in any suitable combination, including without limitation bounding boxes and labels for objects and persons, manual annotations for scene changes and/or timestamps, eye tracking data, saliency maps, or the like.

Further referring to FIG. 14, training data may be filtered, sorted, and/or selected using one or more supervised and/or unsupervised machine-learning processes and/or models as described in further detail below; such models may include without limitation a training data classifier 1416. Training data classifier 1416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1400 may generate a classifier using a classification algorithm, defined as a processes whereby a computing device and/or any module and/or component operating thereon derives a classifier from training data 1404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1416 may classify elements of training data to sets of features of interest for one or more recipient device and/or recipient persons.

Still referring to FIG. 14, machine-learning module 1400 may be configured to perform a lazy-learning process 1420 and/or protocol, which may alternatively be referred to as a "lazyloading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1404. Heuristic may include selecting some number of highest-ranking associations and/or training data 1404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 14, machine-learning processes as described in this disclosure may be used to generate machine-learning models 1424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1424 may be generated by creating an artificial neural network, such as a convolutional neural network comprising an input layer of nodes, one or more intermediate layers, and an output layer of nodes. Connections between nodes may be created via the process of "training" the network, in which elements from a training data 1404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 14, machine-learning algorithms may include at least a supervised machine-learning process 1428. At least a supervised machine-learning process 1428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1404. Persons skilled in the art, upon reviewing the entirety of this disclosure, will be aware of various possible variations of at least a supervised machine-learning process 1428 that may be used to determine relation between inputs and outputs. Supervised machine-learning processes may include classification algorithms as defined above.

Further referring to FIG. 14, machine learning processes may include at least an unsupervised machine-learning processes 1432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 14, machine-learning module 1400 may be designed and configured to create a machine-learning model 1424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 14, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 15:
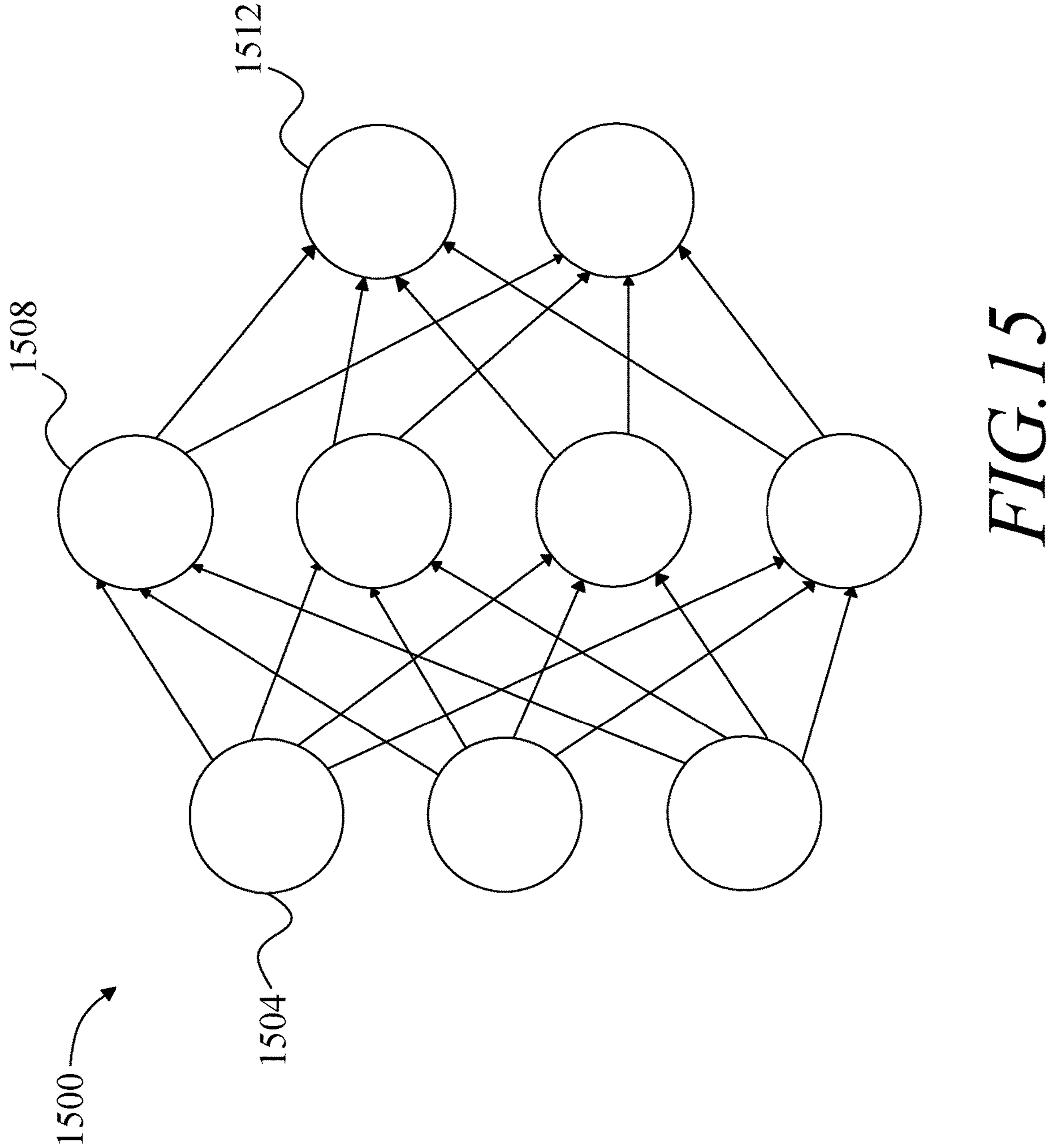
FIG. 15 is a schematic diagram illustrating an exemplary embodiment of a neural network.

Referring now to FIG. 15, an exemplary embodiment of neural network 1500 is illustrated. Neural network 1500, also known as an artificial neural network, is a network of "nodes," or data structures having one or more inputs, one or more outputs, and a function determining outputs based on inputs. Such nodes may be organized in a network, such as without limitation a convolutional neural network, including an input layer 1504 of nodes, one or more intermediate 1508 layers, and an output layer 1512 of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Different layers may be configured to and/or able to learn different elements of a problem and/or knowledge domain to be learned. As a non-limiting example, in a convolutional neural network, shallower layers may "learn" and represent low level features such as corners and edges, while deeper layers may "learn" and represent high level features, such as eyes, windows, and the like. For some tasks to be accomplished by a neural network as described herein, low level information may be more useful, such as for instance for transfer learning architectures, and/or for simple tasks such as line detection or the like, while for some tasks, such as object detection for a specific class, higher level information may be more useful. Layers may be extracted and recombined as needed.

Figure 16:
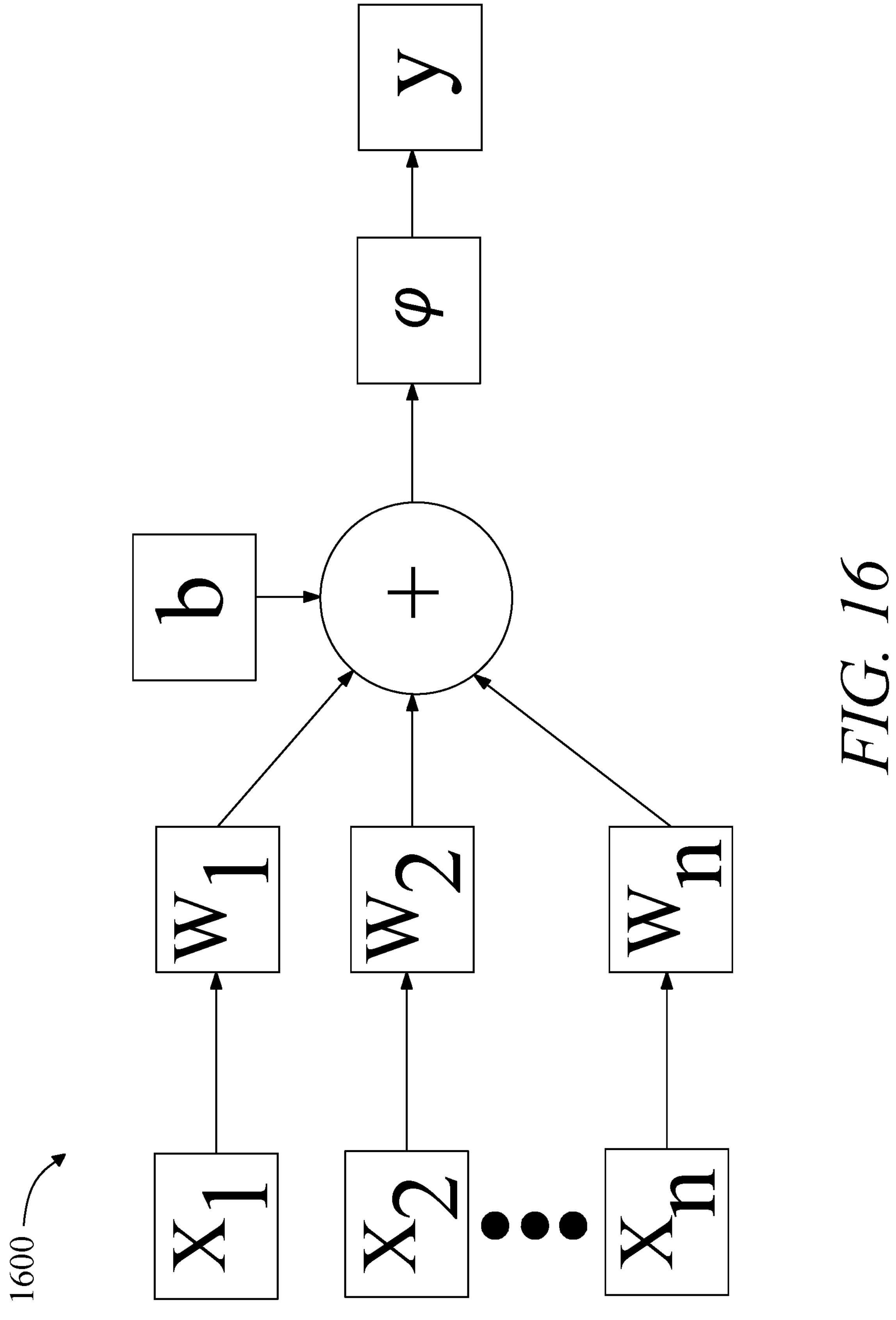
FIG. 16 is a schematic diagram illustrating an exemplary embodiment of a neural network node.

Referring now to FIG. 16, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by inputs xi. Additionally or alternatively, a bias b may be added to the weighted sum of the inputs such that an offset is added to each unit in the neural network layer that is independent of the input to the layer. The weighted sum may then be input into a function cp, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Still referring to FIG. 16, a neural network may receive semantic units as inputs and output vectors representing such semantic units according to weights wi that are derived using machine-learning processes as described in this disclosure.

Figures 17, 18:
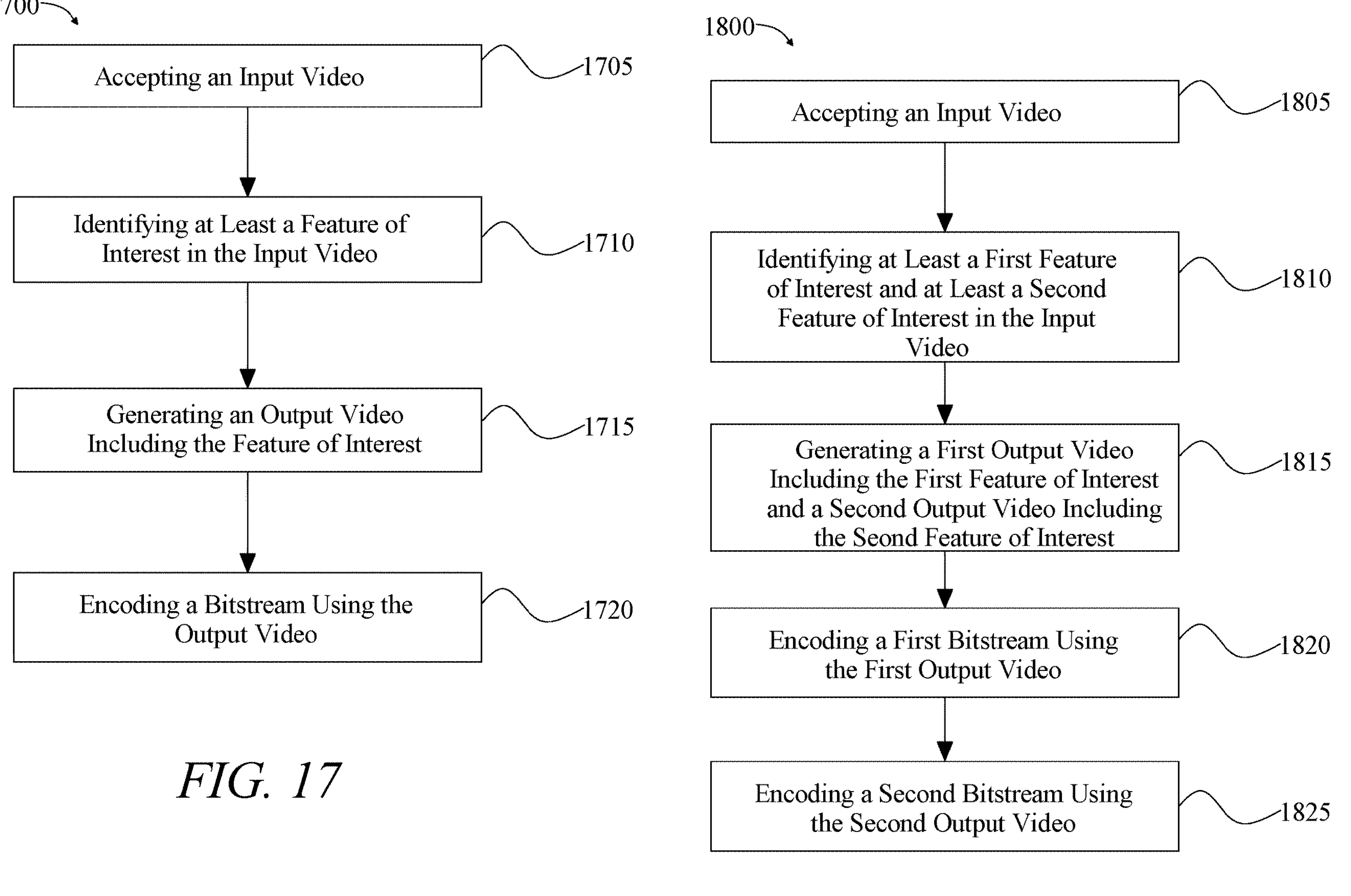
FIG. 17 is a flow diagram illustrating an exemplary method of utility-driven video compression.
FIG. 18 is a flow diagram illustrating an exemplary method of utility-driven video compression.

Referring now to FIG. 17, an exemplary embodiment of a method 1700 of utility-driven video compression is provided. At step 1705, an encoding device 104 accepts an input video 108 having a first data volume; this may be accomplished, without limitation, in any manner described above in reference to FIGS. 1-16. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 1710, and still referring to FIG. 17, encoding device 104 identifies at least a feature of interest in the input video 108; this may be implemented, without limitation, in any manner described above in reference to FIGS. 1-16. For instance and without limitation, encoding device 104 may identify the at least a feature of interest by receiving at least a supervised annotation indicating the at least a feature of interest identifying the at least a feature of interest using the at least a supervised annotation. Alternatively or additionally, encoding device 104 may identify the at least a feature of interest using a neural network. For example, and without limitation, a first neural network configuration may be used to detect faces in video, a second neural network configuration may be used to detect license plates in a video, a third neural network configuration may be used to produce a set of features used by other neural networks or applications, and a fourth neural network configuration may be used to detect backpacks and coats.

Further referring to FIG. 17, encoding device 104 may be configured to receive an output bitstream 124 recipient characteristic and select the neural network from a plurality of neural networks as a function of the output bitstream 124 recipient characteristic. An "output bitstream 124 recipient characteristic," as used in this disclosure, is any information concerning features a recipient and/or recipient device may require, an application for which recipient device will use a bitstream and/or sub-stream, and/or any data from which encoding device 104 may determine such features and/or applications. Neural network may be selected, without limitation, by classification, retrieval from a database, or the like, for instance as described above. At least a feature of interest includes at least an audio feature, for instance and without limitation as detected and/or extracted by audio analyzer 208 as described above. At least a feature of interest may include at least visual feature, which may include any feature of displayed and/or picture data as described above, including without limitation features detected and/or extracted by picture analyzer 212 as described above. At least a feature of interest may include at least an element of metadata, which may include without limitation any metadata as described above, including without limitation metadata detected and/or extracted by metadata analyzer 216.

At step 1715, and still referring to FIG. 17, encoding device 104 generates an output video; this may be implemented without limitation as described above in reference to FIGS. 1-16. Output video may include any data representation of a video including any compressed or uncompressed video file, stream, queue, or the like, as described above. Output video contains a second data volume that is less than the first data volume; in other words, output video omits one or more elements of data present in input video 108. Output video preserves the at least a feature of interest, where "preserving" a feature of interest, as used in this disclosure, signifies containing some representation, identifier, or other datum derived from the feature of interest, up to and including the feature of interest itself and/or a partial reproduction thereof. For instance, where a feature of interest is an image of a face, preserving the feature of interest may include including the image of the face in output video, including an outline or simplified version of the face, including a label and/or datum indicating presence of and/or one or more descriptors of the face, for instance and without limitation using an identifier as described above, and/or indicating blocks, regions, and/or frames containing the image of the face. As further non-limiting example where a feature of interest is motion, preservation of the feature of interest may include indication of region, block, and/or frame containing motion, a temporal section containing motion, or the like, for instance and without limitation as described above.

At step 1720, and with continued reference to FIG. 17, encoding device 104 encodes a bitstream using the output video; this may be implemented without limitation as described above in reference to FIGS. 1-16. Encoding bitstream may include compressing output video, for instance and without limitation as described above in reference to FIGS. 1-16.

Referring now to FIG. 18, an exemplary embodiment of a method 1800 of utility-driven video compression is illustrated. At step 1805, an encoding device 104 accepts an input video 108 having a first data volume; this may be accomplished, without limitation, in any manner described above in reference to FIGS. 1-17. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 1810, and still referring to FIG. 18, encoding device 104 identifies at least a first feature of interest and at least a second feature of interest in the input video 108; this may be implemented, without limitation, in any manner described above in reference to FIGS. 1-17. For instance and without limitation, encoding device 104 may identify at least a first feature of interest and at least a second feature of interest by receiving at least a supervised annotation indicating the at least a first feature of interest and/or at least a second feature of interest and identifying the at least a first feature of interest and/or at least a second feature of interest using the at least a supervised annotation. Alternatively or additionally, encoding device 104 may identify the at least a feature of interest using a neural network.

Further referring to FIG. 18, encoding device 104 may be configured to receive an output bitstream 124 recipient characteristic and select the neural network from a plurality of neural networks as a function of the output bitstream 124 recipient characteristic. An "output bitstream 124 recipient characteristic," as used in this disclosure, is any information concerning features a recipient and/or recipient device may require, an application for which recipient device will use a bitstream and/or sub-stream, and/or any data from which encoding device 104 may determine such features and/or applications. Neural network may be selected, without limitation, by classification, retrieval from a database, or the like, for instance as described above. At least a first feature of interest and/or at least a second feature of interest may include at least an audio feature, for instance and without limitation as detected and/or extracted by audio analyzer 208 as described above. At least a first feature of interest and/or at least a second feature of interest may include at least visual feature, which may include any feature of displayed and/or picture data as described above, including without limitation features detected and/or extracted by picture analyzer 212 as described above At least a first feature of interest and/or at least a second feature of interest may include at least an element of metadata, which may include without limitation any metadata as described above, including without limitation metadata detected and/or extracted by metadata analyzer 216.

At step 1815, and still referring to FIG. 18, encoding device 104 generates a first output video and a second output video; each of first output video and second output video may be generated in any manner suitable for generation of an output video as described above in reference to FIG. 17. First output video contains a second data volume that is less than first data volume. First output video preserves at least a first feature of interest. Second output video contains a third data volume that is less than first data volume. Second output video preserves at least a second feature of interest.

At step 1820, encoding device 104 encodes a first bitstream using first output video; this may be implemented as described above in reference to FIG. 17 for encoding an output bitstream 124. First bitstream may include a sub-bitstream as described above and may be combined with additional bitstreams and/or data in an output bitstream 124. At step 1825, encoding device 104 encodes a second bitstream using second output video; this may be implemented as described above in reference to FIG. 17 for encoding an output bitstream 124. First bitstream may include a sub-bitstream as described above and may be combined with additional bitstreams and/or data, including without limitation first bitstream, in an output bitstream 124.

Figures 19, 20:
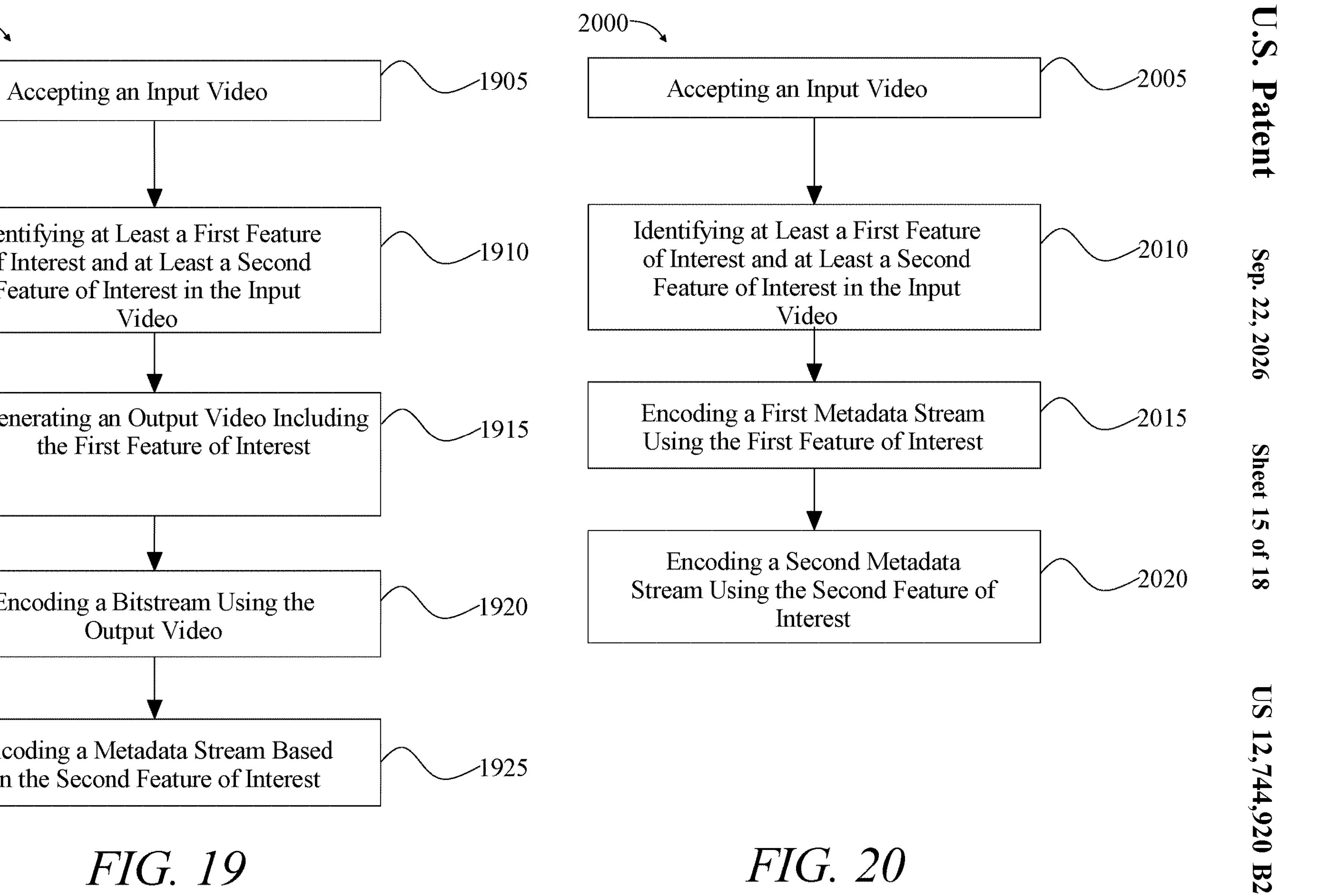
FIG. 19 is a flow diagram illustrating an exemplary method of utility-driven video compression.
FIG. 20 is a flow diagram illustrating an exemplary method of utility-driven video compression.

Referring now to FIG. 19, an exemplary embodiment of a method 1900 of utility-driven video compression is illustrated. At step 1905, an encoding device 104 accepts an input video 108 having a first data volume; this may be accomplished, without limitation, in any manner described above in reference to FIGS. 1-17. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 1910, and still referring to FIG. 19, encoding device 104 identifies at least a first feature of interest and at least a second feature of interest in the input video 108; this may be implemented, without limitation, in any manner described above in reference to FIG. 18. For instance and without limitation, encoding device 104 may identify the at least a feature of interest by receiving at least a supervised annotation indicating the at least a feature of interest identifying the at least a feature of interest using the at least a supervised annotation. Alternatively or additionally, encoding device 104 may identify the at least a feature of interest using a neural network.

Further referring to FIG. 19, encoding device 104 may be configured to receive an output bitstream 124 recipient characteristic and select the neural network from a plurality of neural networks as a function of the output bitstream 124 recipient characteristic. An "output bitstream 124 recipient characteristic," as used in this disclosure, is any information concerning features a recipient and/or recipient device may require, an application for which recipient device will use a bitstream and/or sub-stream, and/or any data from which encoding device 104 may determine such features and/or applications. Neural network may be selected, without limitation, by classification, retrieval from a database, or the like, for instance as described above. At least a feature of interest includes at least an audio feature, for instance and without limitation as detected and/or extracted by audio analyzer 208 as described above. At least a feature of interest may include at least visual feature, which may include any feature of displayed and/or picture data as described above, including without limitation features detected and/or extracted by picture analyzer 212 as described above. At least a feature of interest may include at least an element of metadata, which may include without limitation any metadata as described above, including without limitation metadata detected and/or extracted by metadata analyzer 216.

At step 1915, and still referring to FIG. 19, encoding device 104 generates an output video; this may be implemented without limitation as described above in reference to FIGS. 1-17. Output video contains a second data volume that is less than the first data volume; in other words, output video omits one or more elements of data present in input video 108. Output video preserves the at least a first feature of interest. At step 1920, and further referring to FIG. 19, encoding device 104 encodes a bitstream using the output video; this may be implemented in any manner described above in reference to FIG. 17.

At step 1925, and still referring to FIG. 19, encoding device 104 encodes a metadata stream as a function of the second feature of interest; this may be implemented, without limitation, as described above in reference to FIGS. 1-16. Metadata stream may preserve at least a second feature of interest as described above in reference to FIGS. 1-18. Metadata stream may include a sub-stream as described above and may be combined with other sub-streams in an output bitstream 124. Metadata may be encoded to associate metadata with a portion of video or audio. Metadata may contain numeric or character/textual data. Metadata may be encoded as name-value pairs encoded as plain, ASCII, and/or UNICODE text, as non-limiting examples, or encoded as a set of pre-defined fields.

Referring now to FIG. 20, an exemplary embodiment of a method 2000 of utility-driven video compression is illustrated. At step 2005, an encoding device 104 accepts an input video 108 having a first data volume; this may be accomplished, without limitation, in any manner described above in reference to FIGS. 1-19. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 2010, and still referring to FIG. 20, encoding device 104 identifies at least a first feature of interest and at least a second feature of interest in the input video 108; this may be implemented, without limitation, in any manner described above in reference to FIGS. 1-19. For instance and without limitation, encoding device 104 may identify at least a first feature of interest and at least a second feature of interest by receiving at least a supervised annotation indicating the at least a first feature of interest and/or at least a second feature of interest and identifying the at least a first feature of interest and/or at least a second feature of interest using the at least a supervised annotation. Alternatively or additionally, encoding device 104 may identify the at least a feature of interest using a neural network. At step 2015, and with continued reference to FIG. 20, encoding device encodes a first metadata stream as a function of the first feature of interest; this may be implemented, without limitation, as described above in reference to FIG. 19. First metadata stream may preserve at least a second feature of interest as described above in reference to FIGS. 1-19. First metadata stream may include a sub-stream as described above and may be combined with other sub-streams in an output bitstream 124.

At step 2020, and still referring to FIG. 20, encoding device 104 encodes a second metadata stream as a function of the second feature of interest; this may be implemented, without limitation, as described above in reference to FIG. 19. Second metadata stream may preserve at least a second feature of interest as described above in reference to FIGS. 1-19. Second metadata stream may include a sub-stream as described above and may be combined with other sub-streams in an output bitstream 124.

Figures 21, 22:
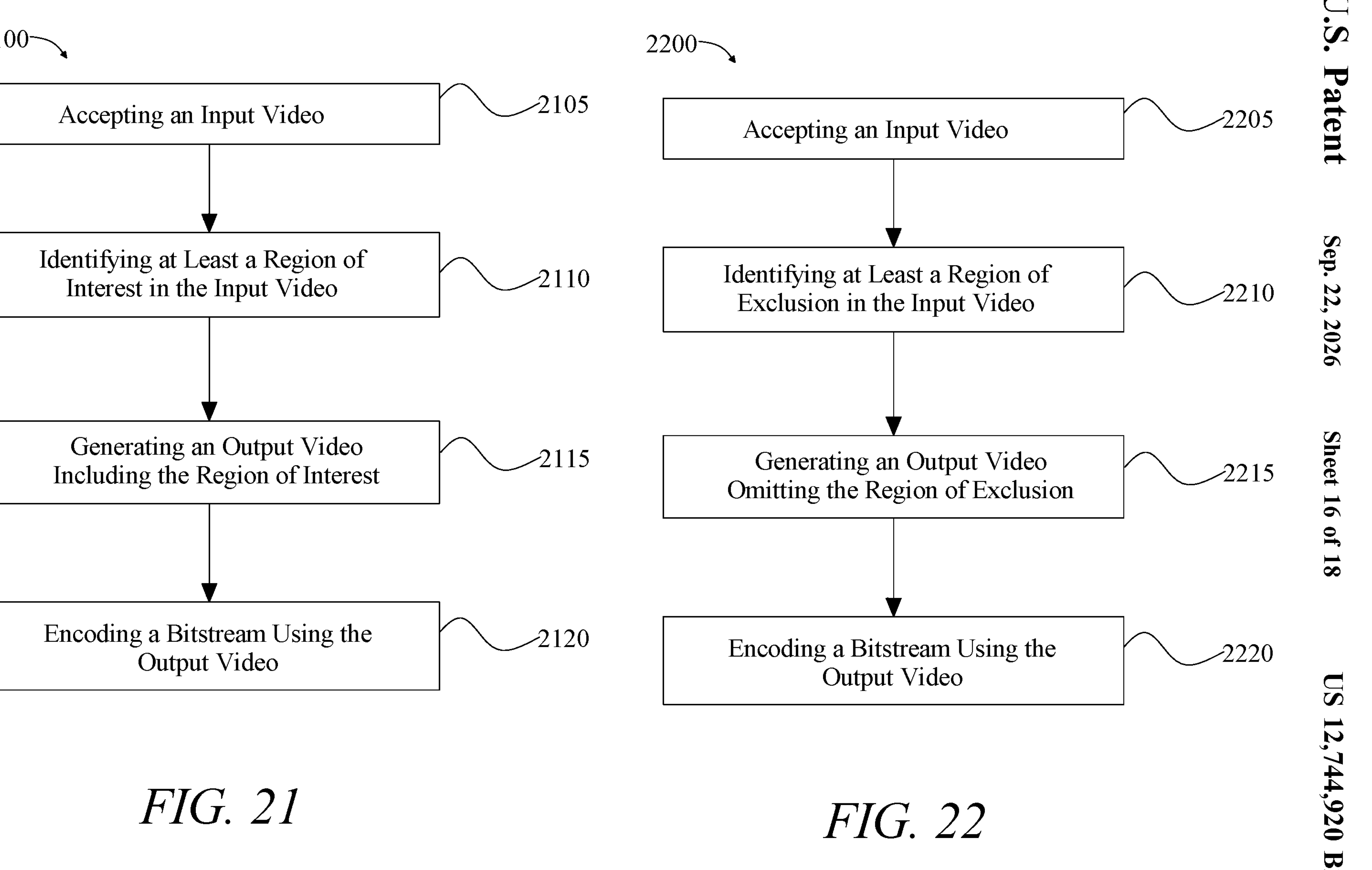
FIG. 21 is a flow diagram illustrating an exemplary method of utility-driven video compression.
FIG. 22 is a flow diagram illustrating an exemplary method of utility-driven video compression.

Referring now to FIG. 21, an exemplary embodiment of a method 2100 of utility-driven video compression is illustrated. At step 2105, an encoding device 104 accepts an input video 108 having a first data volume; this may be accomplished, without limitation, in any manner described above in reference to FIGS. 1-16. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 2110, and still referring to FIG. 21, encoding device 104 identifies at least a region of interest in the input video 108; this may be implemented, without limitation, in any manner described above for identification of a feature of interest in reference to FIGS. 1-17. At least a region of interest may include any region as described above in reference to FIGS. 1-16, including without limitation a coding unit 120, a block, a plurality of blocks, a region, a sub-frame, and/or a frame.

At step 2115, and further referring to FIG. 21, encoding device 104 generates an output video; this may be implemented in any manner described above in reference to FIGS. 1-20. Output video contains a second data volume that is less than first data volume. Output video preserves the at least a region of interest. At step 2120, and still referring to FIG. 21, encoding device 104 encodes a bitstream using the output video; this may be implemented, without limitation, in any manner described above in reference to FIGS. 1-20.

Referring now to FIG. 22, an exemplary embodiment of a method 2200 of utility-driven video compression is illustrated. At step 2205, an encoding device 104 accepts an input video 108 having a first data volume; this may be accomplished, without limitation, in any manner described above in reference to FIGS. 1-21. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 2210, and still referring to FIG. 22, encoding device 104 identifies at least a region of exclusion in input video 108; this may be implemented, without limitation, in any manner described above for identification of a feature of interest in reference to FIGS. 1-17. At least a region of exclusion may include any region as described above in reference to FIGS. 1-16, including without limitation a coding unit 120, a block, a plurality of blocks, a region, a sub-frame, and/or a frame. At step 2215, and with continuing reference to FIG. 22, encoding device 104 generates an output video; this may be implemented in any manner described above in reference to FIGS. 1-20. Output video contains a second data volume that is less than first data volume. Output video omits the at least a region of exclusion.

Figure 23:
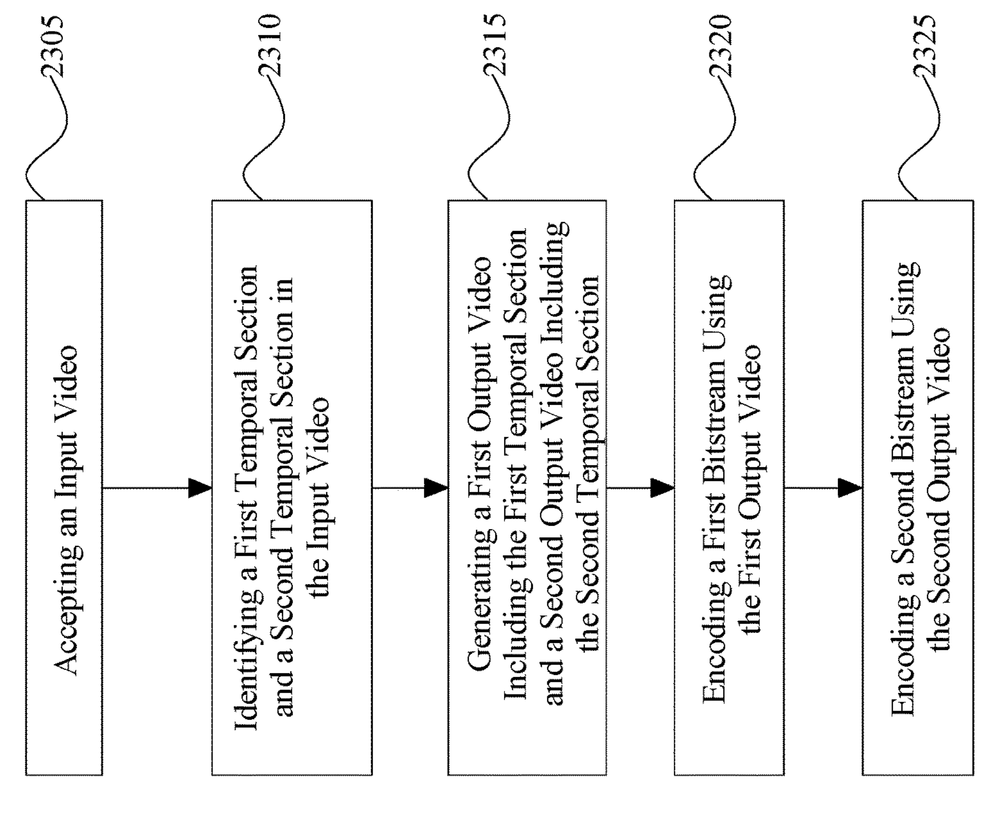
FIG. 23 is a flow diagram illustrating an exemplary method of utility-driven video compression.

At step 2220, encoding device 104 encodes a bitstream using the output video; this may be implemented, without limitation, in any manner described above in reference to FIGS. 1-21. Referring now to FIG. 23, an exemplary embodiment of a method 2300 of utility-driven video compression is illustrated. At step 2305 an encoding device 104 accepts an input video 108 having a first data volume; this may be accomplished, without limitation, in any manner described above in reference to FIGS. 1-22. For instance, encoding device 104 may be configured to accept input video 108 by receiving an input bitstream and decoding the input video 108 from the input bitstream, as described above. Alternatively or additionally, encoding device 104 may receive and/or store a video file. First data volume may be a quantity of data as measured in bytes, bits, and/or any other unit of data quantity that may occur to a person skilled in the art upon reviewing the entirety of this disclosure.

At step 2310, and still referring to FIG. 23, encoding device 104 identifies a first temporal section including a first feature of interest and a second temporal section including a second feature of interest in the input video 108. Identification of first and second features of interest may be implemented as described above in reference to FIGS. 1-22. Identification of first temporal region and second temporal region may be performed as described above in reference to FIGS. 1-22. At step 2315, and with continued reference to FIG. 23, encoding device 104 generates a first output video and a second output video; this may be implemented in any manner described above in reference to FIGS. 1-22. First output video contains a second data volume that is less than first data volume. First output video contains and/or preserves first temporal section. Second output video contains a third data volume that is less than first data volume. Second output video contains and/or preserves second temporal section At step 2320, encoding device 104 encodes a first bitstream using the first output video; this may be implemented, without limitation, as described above in reference to FIGS. 1-22. At step 2325, encoding device 104 encodes a second bitstream using the second output video; this may be implemented, without limitation, as described above in reference to FIGS. 1-22.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM"

device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 24:
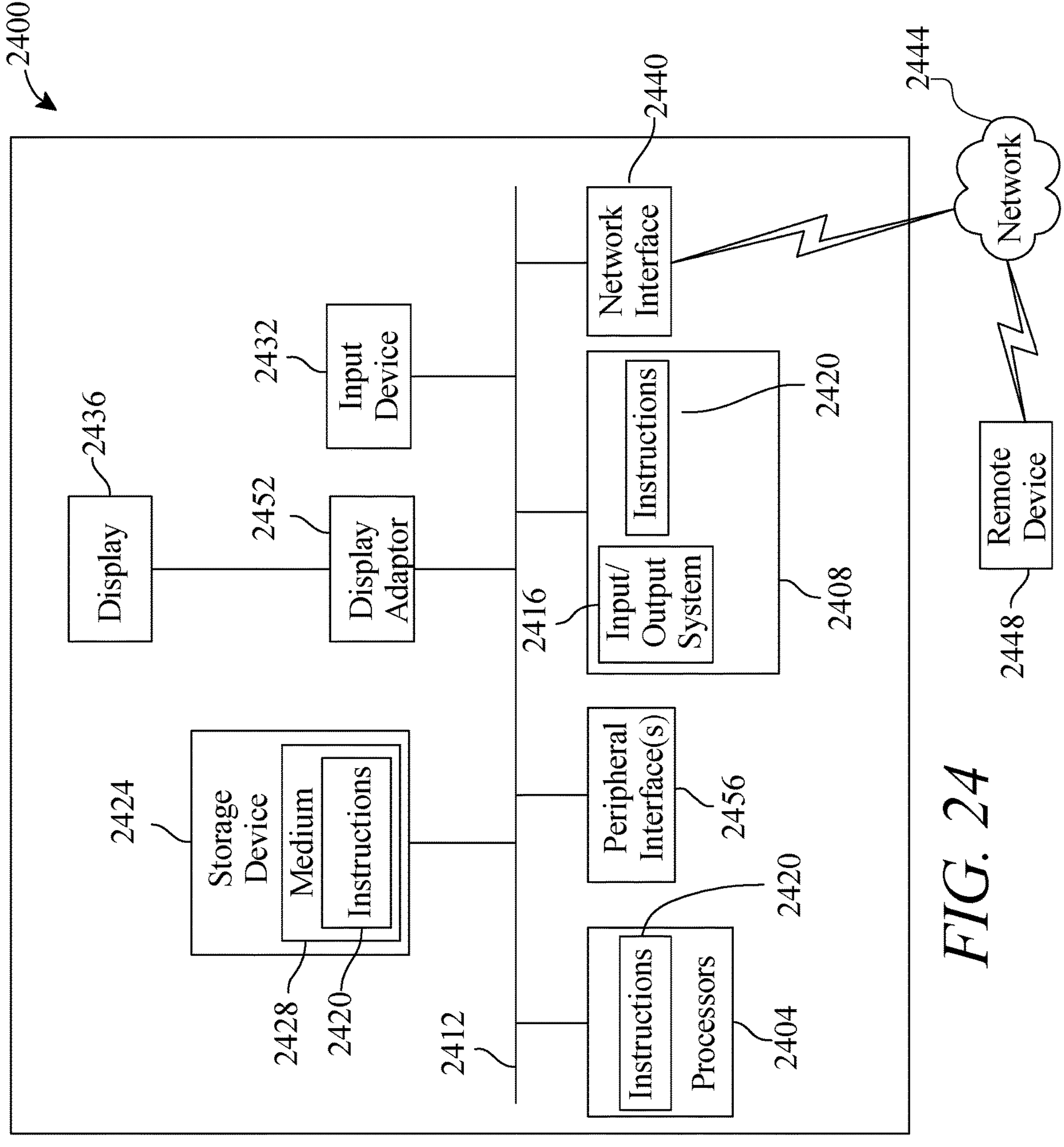
FIG. 24 is a block diagram of a computing system that can be used to implement any one or more of the methodologies disclosed herein and any one or more portions thereof.

FIG. 24 shows a diagrammatic representation of one embodiment of a computing device in the exemplary form of a computer system 2400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2400 includes a processor 2404 and a memory 2408 that communicate with each other, and with other components, via a bus 2412. Bus 2412 may include any of several types of bus structures including, but not limited to, a memory bus, a memory controller, a peripheral bus, a local bus, and any combinations thereof, using any of a variety of bus architectures.

Memory 2408 may include various components (e.g., machine-readable media) including, but not limited to, a random-access memory component, a read only component, and any combinations thereof. In one example, a basic input/output system 2416 (BIOS), including basic routines that help to transfer information between elements within computer system 2400, such as during start-up, may be stored in memory 2408. Memory 2408 may also include (e.g., stored on one or more machine-readable media) instructions (e.g., software) 2420 embodying any one or more of the aspects and/or methodologies of the present disclosure. In another example, memory 2408 may further include any number of program modules including, but not limited to, an operating system, one or more application programs, other program modules, program data, and any combinations thereof. Computer system 2400 may also include a storage device 2424. Examples of a storage device (e.g., storage device 2424) include, but are not limited to, a hard disk drive, a magnetic disk drive, an optical disc drive in combination with an optical medium, a solid-state memory device, and any combinations thereof. Storage device 2424 may be connected to bus 2412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2424 (or one or more components thereof) may be removably interfaced with computer system 2400 (e.g., via an external port connector (not shown)). Particularly, storage device 2424 and an associated machine-readable medium 2428 may provide nonvolatile and/or volatile storage of machine-readable instructions, data structures, program modules, and/or other data for computer system 2400. In one example, software 2420 may reside, completely or partially, within machine-readable medium 2428. In another example, software 2420 may reside, completely or partially, within processor 2404.

Computer system 2400 may also include an input device 2432. In one example, a user of computer system 2400 may enter commands and/or other information into computer system 2400 via input device 2432. Examples of an input device 2432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2432 may be interfaced to bus 2412 via any of a variety of interfaces (not shown) including, but not limited to, a serial interface, a parallel interface, a game port, a USB interface, a FIREWIRE interface, a direct interface to bus 2412, and any combinations thereof. Input device 2432 may include a touch screen interface that may be a part of or separate from display 2436, discussed further below. Input device 2432 may be utilized as a user selection device for selecting one or more graphical representations in a graphical interface as described above.

A user may also input commands and/or other information to computer system 2400 via storage device 2424 (e.g., a removable disk drive, a flash drive, etc.) and/or network interface device 2440. A network interface device, such as network interface device 2440, may be utilized for connecting computer system 2400 to one or more of a variety of networks, such as network 2444, and one or more remote devices 2448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2444, may employ a wired and/or a wireless mode of communication. In general, any network topology may be used. Information (e.g., data, software 2420, etc.) may be communicated to and/or from computer system 2400 via network interface device 2440.

Computer system 2400 may further include a video display adapter 2452 for communicating a displayable image to a display device, such as display device 2436. Examples of a display device include, but are not limited to, a liquid crystal display (LCD), a cathode ray tube (CRT), a plasma display, a light emitting diode (LED) display, and any combinations thereof. Display adapter 2452 and display device 2436 may be utilized in combination with processor 2404 to provide graphical representations of aspects of the present disclosure. In addition to a display device, computer system 2400 may include one or more other peripheral output devices including, but not limited to, an audio speaker, a printer, and any combinations thereof. Such peripheral output devices may be connected to bus 2412 via a peripheral interface 2456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the 25 term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An encoding device for utility-driven video compression, the encoding device comprising circuitry configured to:

accept an input video having a first data volume comprising at least one frame, each frame comprising a plurality of blocks;

identify at least one region of interest in a first spatial region of the first data volume, the first spatial region comprising a first plurality of included blocks;

identify at least a feature reflecting a structural or content attribute of the at least one region of interest;

identify a region of exclusion identified as a region containing blocks associated with at least one object detected in the input video, the at least one object including at least one of a human face, a person, a vehicle, or a license plate, the at least one object being a feature to be selectively excluded from the bitstream;

generate an output video, wherein:

the output video contains a second data volume that is less than the first data volume; and the output video preserves the at least a feature of the region of interest; and generate an encoded bitstream including the output video and signaling information including a header indicating a block-level association of blocks to regions in the second data volume.

2. The encoding device of claim 1, wherein the encoding device is further configured to accept the input video by:

receiving an input bitstream; and decoding the input video from the input bitstream.

3. The encoder of claim 1, further configured to identify the at least a feature of interest by:

receiving at least a supervised annotation indicating the at least a feature of interest; and identifying the at least a feature of interest using the at least a supervised annotation.

4. The encoder of claim 1, further configured to identify the at least a feature of interest using a neural network.

5. The encoder of claim 4, further configured to:

receive an output bitstream recipient characteristic; and select the neural network from a plurality of neural networks as a function of the output bitstream recipient characteristic.

6. The encoding device of claim 1, wherein the at least a feature of interest includes at least one of an audio feature, a visual feature, and an element of metadata.

7. The encoding device of claim 1, wherein the header includes a privacy flag for each block and the flag for the blocks of a region of exclusion are set to indicate exclusion from the encoded bitstream.

8. The encoding device of claim 1, wherein the-block-level association includes a spatial region identifier.

9. The encoding device of claim 1, wherein encoding the bitstream further comprises compressing the output video.

10. The encoding device of claim 1, wherein the header is a slice header.

11. The encoding device of claim 1, wherein the signaling information is provided in a sequence parameter set (SPS) in a slice header of the bitstream.

12. The encoding device of claim 1, wherein the feature describes at least one of spatial and temporal characteristics of a frame or group of frames in the output video.

13. The encoding device of claim 1, wherein signaling information is provided as supplemental information in the bitstream.

14. The encoding device of claim 13, wherein the second feature is motion information of blocks sufficient to perform motion analysis.

15. A method for utility-driven video compression, the method comprising:

accepting, by an encoding device, an input video having a first data volume comprising at least one frame, each frame comprising a plurality of blocks;

identify, by the encoding device, at least one region of interest in a first spatial region of the first data volume, the first spatial region comprising a first plurality of included blocks;

identifying, by the encoding device, at least a feature reflecting a structural or content attribute of the at least one region of interest;

identifying, by the encoding device, a region of exclusion identified as a region containing blocks associated with at least one object detected in the input video, the at least one object including at least one of a human face, a person, a vehicle, or a license plate, the at least one object being a feature to be selectively excluded from the bitstream;

generating, by the encoding device, an output video, wherein:

the output video contains a second data volume that is less than the first data volume; and the output video preserves the at least a feature of the region of interest; and generating, by the encoding device, an encoded bitstream including the output video and signaling information including a header indicating a block-level association of blocks to regions in the second data volume.

16. The method of claim 15, wherein accepting the input video further comprises:

receiving an input bitstream; and decoding the input video from the input bitstream.

17. The encoder of claim 15, wherein identifying the at least a feature of interest further comprises:

receiving at least a supervised annotation indicating the at least a feature of interest; and identifying the at least a feature of interest using the at least a supervised annotation.

18. The encoder of claim 15, wherein identifying the at least a feature of interest further comprises identifying the at least a feature of interest using a neural network.

19. The encoder of claim 18 further comprising:

receiving an output bitstream recipient characteristic; and selecting the neural network from a plurality of neural networks as a function of the output bitstream recipient characteristic.

20. The method of claim 15, wherein the at least a feature of interest includes at least one of an audio feature, a visual feature, and an element of metadata.

21. The method of claim 15, wherein the header includes a privacy flag for each block and the flag for the blocks of a region of exclusion are set to indicate exclusion from the encoded bitstream.

22. The method of claim 15, wherein the block-level association includes a spatial region identifier.

23. The method of claim 15, wherein encoding the bitstream further comprises compressing the output video.

24. An encoding device for utility-driven video compression, the encoding device comprising circuitry configured to:

accept an input video comprising a plurality of frames and having a first data volume;

identify in the input video at least a first feature relevant to a first application and a second feature relevant to a second application, wherein the first and second feature each concerning a specific structural or content attribute of the input video;

generate a first encoded application specific sub-bitstream for human viewing consisting essentially of a subset of frames including the first feature and having a volume less than the first data volume; and generate a second encoded application specific sub-bitstream for a machine-based application consisting essentially of a subset of frames including the second feature and having a volume less than the first data volume, the second encoded application specific sub-bitstream comprising motion information of blocks in the input video and excluding texture data and color data of the blocks, the second encoded application specific sub-bitstream being incapable of reconstructing pixels of the input video necessary for human viewing.

* * * * *